US012592623B2

(12) United States Patent
Itasaka

(10) Patent No.: US 12,592,623 B2
(45) Date of Patent: Mar. 31, 2026

(54) ROTOR STRUCTURE OF ROTARY ELECTRIC MACHINE

(71) Applicant: Mazda Motor Corporation, Aki-gun (JP)

(72) Inventor: Naoki Itasaka, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 340 days.

(21) Appl. No.: 18/397,701

(22) Filed: Dec. 27, 2023

(65) Prior Publication Data

US 2024/0258891 A1 Aug. 1, 2024

(30) Foreign Application Priority Data

Jan. 31, 2023 (JP) ................................ 2023-012780

(51) Int. Cl.
*H02K 21/02* (2006.01)
*B60K 6/26* (2007.10)

(52) U.S. Cl.
CPC .............. *H02K 21/029* (2013.01); *B60K 6/26* (2013.01); *B60Y 2200/92* (2013.01); *B60Y 2400/60* (2013.01)

(58) Field of Classification Search
CPC .... B60K 2006/4825; B60K 6/26; B60K 6/48; B60Y 2200/92; B60Y 2400/60;

(Continued)

(56) References Cited

U.S. PATENT DOCUMENTS

| 9,735,660 B2 * | 8/2017 | Shibata | ................... | H02K 1/276 |
| 9,748,806 B2 * | 8/2017 | Koka | ...................... | H02K 21/14 |

(Continued)

FOREIGN PATENT DOCUMENTS

| EP | 1487084 A1 | 12/2004 |
| EP | 4012893 A1 | 6/2022 |
| JP | 2021027700 A | 2/2021 |

OTHER PUBLICATIONS

European Patent Office, Extended European Search Report Issued in Application No. 24153866.9, Oct. 24, 2024, 16 pages.

*Primary Examiner* — Alex W Mok
(74) *Attorney, Agent, or Firm* — Alleman Hall LLP

(57) ABSTRACT

A rotor structure including a rotor, a stator, and magnetic pole parts is provided. Each magnetic pole part includes a radially-magnetized fixed magnetic-force magnet, first variable magnetic-force magnets which are disposed radially outward of, and at both circumferential end sides of, the fixed magnetic-force magnet, respectively, and have a magnetization state that is changeable in the circumferential direction by a magnetic flux, and a high magnetic-reluctance part formed between the fixed magnetic-force magnet and the first variable magnetic-force magnet in the circumferential direction and having a magnetic reluctance higher than the rotor core. The high magnetic-reluctance part includes a first vertically extending part radially extending at a position near the fixed magnetic-force magnet, a second vertically extending part radially extending at a position near one first variable magnetic-force magnet in the circumferential direction, and a laterally extending part connecting the first and second vertically extending parts in the circumferential direction.

20 Claims, 10 Drawing Sheets

(58) Field of Classification Search
CPC .......... H02K 1/02; H02K 1/246; H02K 1/276;
H02K 1/2766; H02K 21/029
USPC .................................................... 310/156.07
See application file for complete search history.

(56) References Cited

U.S. PATENT DOCUMENTS

| | | | | |
|---|---|---|---|---|
| 9,853,509 | B2 * | 12/2017 | Fujisawa ................ | H02K 1/272 |
| 11,309,777 | B2 * | 4/2022 | Kanada .................. | H02K 1/272 |
| 11,349,420 | B2 * | 5/2022 | Takahashi ............... | H02K 3/12 |
| 12,483,102 | B2 * | 11/2025 | Itasaka ................ | H02K 1/2766 |
| 2011/0175478 | A1 * | 7/2011 | Sakai ................... | H02K 1/2766 |
| | | | | 310/156.01 |
| 2014/0312730 | A1 * | 10/2014 | Shibata .................. | H02K 16/02 |
| | | | | 310/191 |
| 2015/0115758 | A1 * | 4/2015 | Koka ..................... | H02K 21/14 |
| | | | | 318/139 |
| 2018/0091009 | A1 * | 3/2018 | Kusase ................ | H02K 1/2773 |
| 2021/0281132 | A1 * | 9/2021 | Akita ................... | H02K 1/2766 |
| 2021/0281153 | A1 * | 9/2021 | Kanada .................. | H02K 1/274 |
| 2022/0294289 | A1 * | 9/2022 | Okuyama ............. | H02K 21/16 |
| 2024/0258892 | A1 * | 8/2024 | Itasaka ................ | H02K 1/2766 |

* cited by examiner

ROTOR STRUCTURE OF ROTARY ELECTRIC MACHINE

TECHNICAL FIELD

The art disclosed herein belongs to a technical field related to a rotor structure of a rotary electric machine.

BACKGROUND OF THE DISCLOSURE

In recent years, as a rotor of a rotary electric machine, one provided with a fixed magnetic-force magnet for which it is difficult to change a magnetization state, and a variable magnetic-force magnet for which its magnetization state is easily changed is proposed.

JP2021-027700A discloses a rotor structure provided with a plurality of magnetic pole parts which are lined up in a circumferential direction of a rotor core. Each magnetic pole part includes a first fixed magnetic-force magnet disposed at the center in the circumferential direction, a variable magnetic-force magnet which is disposed on both sides of the first fixed magnetic-force magnet in the circumferential direction and radially outward of the fixed magnetic-force magnet, a magnetization state thereof being changeable, and a second fixed magnetic-force magnet disposed radially inward of the first fixed magnetic-force magnet. The first fixed magnetic-force magnet is disposed magnetically in series with the variable magnetic-force magnet, and the second fixed magnetic-force magnet is disposed magnetically in parallel with the variable magnetic-force magnet.

In the case of the rotor structure like JP2021-027700A, the first fixed magnetic-force magnet and the second fixed magnetic-force magnet may be magnetized so that the radially outward sides become N-poles. When the magnetizing direction of the variable magnetic-force magnet is a direction from the variable magnetic-force magnet to the first fixed magnetic-force magnet, the magnetic flux which interlinks with a stator is increased (hereinafter, referred to as a "magnetizing state"). On the other hand, when the magnetizing direction of the variable magnetic-force magnet is a direction from the first fixed magnetic-force magnet to the variable magnetic-force magnet, the magnetic flux which interlinks with the stator is decreased (hereinafter, referred to as a "demagnetizing state").

Here, when switching between the magnetizing state and the demagnetizing state, it is necessary to concentrate the magnetic flux to the variable magnetic-force magnet to change the magnetization state of the variable magnetic-force magnet. On the other hand, when operating the motor at a high output, in order to maintain a state where the opposing components of the magnetic forces of the stator and the rotor are substantially coincident with each other, it is necessary to make the magnetic flux more difficult to be inputted into the variable magnetic-force magnet so that the magnetization state of the variable magnetic-force magnet does not change.

According to the diligent research by the present inventors, it was found that the rotor structure like JP2021-027700A has the following problem. As illustrated in FIGS. 10A and 10B, changing electric current which flows into a coil only changes slightly a position at which the magnetic flux from a stator side and the magnetic flux from fixed magnetic-force magnet repel each other, and thus, the magnetic flux is still inputted into the variable magnetic-force magnet. Therefore, there is room for improvement from the viewpoint of the controllability of the magnetic flux being inputted into the variable magnetic-force magnet.

SUMMARY OF THE DISCLOSURE

The art disclosed herein is made in view of the problem described above, and one purpose thereof is to improve controllability of a magnetic flux being inputted into a variable magnetic-force magnet.

In order to solve the above-described problem, a first aspect of the art disclosed herein relates to a rotor structure of a rotary electric machine, which includes a rotor having a rotor core, a stator disposed radially outward of the rotor, around which a coil into which current flows is wound, and a plurality of magnetic pole parts provided to the rotor core and lined up in a circumferential direction of the rotor core. Each of the magnetic pole parts includes a fixed magnetic-force magnet being magnetized in a radial direction of the rotor core, and first variable magnetic-force magnets disposed radially outward of the fixed magnetic-force magnet, at both sides of the fixed magnetic-force magnet in the circumferential direction, respectively. A magnetization state of the first variable magnetic-force magnets is changeable in the circumferential direction by a given magnetic flux. A high magnetic-reluctance part is formed between the fixed magnetic-force magnet and one of the first variable magnetic-force magnets of the rotor core in the circumferential direction. The high magnetic-reluctance part has a magnetic reluctance higher than the rotor core. The high magnetic-reluctance part includes a first vertically extending part extending in the radial direction toward an outer edge part of the rotor core from the fixed magnetic-force magnet, at a position near the fixed magnetic-force magnet in the circumferential direction, a second vertically extending part extending in the radial direction toward the outer edge part of the rotor core, at a position near the one first variable magnetic-force magnet in the circumferential direction, and a laterally extending part connecting the first vertically extending part to the second vertically extending part in the circumferential direction.

According to this configuration, when the magnetizing direction of the fixed magnetic-force magnet of one magnetic pole part is a direction from radially inside to outside, for the one magnetic pole part, when the magnetizing direction of the first variable magnetic-force magnets is oriented in a direction from the first variable magnetic-force magnet toward the fixed magnetic-force magnet, the magnetic flux which interlinks with the stator is increased (hereinafter, referred to as a "magnetizing state"). On the other hand, when the magnetizing direction of the first variable magnetic-force magnets is oriented in a direction from the fixed magnetic-force magnet to the first variable magnetic-force magnet, the magnetic flux which interlinks with the stator is decreased (hereinafter, referred to as a "demagnetizing state").

According to the above configuration, since the high magnetic-reluctance part has the first vertically extending part and the second vertically extending part, the magnetic flux from the fixed magnetic-force magnet has difficulty flowing into the first variable magnetic-force magnets so that it tends to be short-circuited near the fixed magnetic-force magnet. When the current which flows into the coil is small, the magnetic flux from the stator is canceled out by the magnetic flux from the fixed magnetic-force magnet, and thus, it hardly flows into the rotor core. Further, even if the magnetic flux from the stator enters the rotor core, its flow to the first variable magnetic-force magnets is intercepted by the first vertically extending part and the second vertically extending part. Further, when the current which flows into the coil is small, since the magnetic flux from the fixed magnetic-force magnets only weakly repels the magnetic flux from the stator, a short circuit is formed so that it is difficult for the magnetic flux to flow into the first variable magnetic-force magnet. On the other hand, when the current which flows into the coil is large, the magnetic flux from the stator and the magnetic flux from the fixed magnetic-force magnet strongly repel each other. Thus, the magnetic flux from the fixed magnetic-force magnet and the magnetic flux from the stator which repel each other pass through the first vertically extending part and the second vertically extending part, and flow toward the one first variable magnetic-force magnet. At this time, this repulsive magnetic flux can flow into the first variable magnetic-force magnet efficiently because of the existence of the laterally extending part. Therefore, the controllability of the magnetic flux which is inputted into the first variable magnetic-force magnet can be improved.

According to a second aspect of the art disclosed herein, in the first aspect, a minimum value of a magnetic reluctance of the laterally extending part may be larger than a minimum value of a magnetic reluctance of the first vertically extending part, and may be smaller than a minimum value of a magnetic reluctance of the second vertically extending part.

According to the above configuration, in the high magnetic-reluctance part, the magnetic flux easily passes through the first vertically extending part, but passes through the second vertically extending part with more difficulty. Thus, even if the magnetic flux from the fixed magnetic-force magnet passes through the first vertically extending part, the flow into the one first variable magnetic-force magnet is prevented by the second vertically extending part so that it easily forms the short-circuit path. Therefore, the controllability of the magnetic flux which is inputted into the first variable magnetic-force magnet can be further improved.

According to a third aspect of the art disclosed herein, in the second aspect, magnetic reluctances per unit magnetic path length of the first vertically extending part, the second vertically extending part, and the laterally extending part may be substantially the same. A minimum value of a width of the laterally extending part in the radial direction may be larger than a minimum value of a width of the first vertically extending part in the circumferential direction, and may be smaller than a minimum value of a width of the second vertically extending part in the circumferential direction.

According to the above configuration, among the parts of the high magnetic-reluctance part, the minimum value of the width is large in the order of the first vertically extending part, the laterally extending part, and the second vertically extending part. Since the magnetic reluctances per unit magnetic path length of these parts are substantially the same, in the high magnetic-reluctance part, the magnetic flux most easily passes through the first vertically extending part, but passes through the second vertically extending part with the most difficulty. Thus, even if the magnetic flux from the fixed magnetic-force magnet passes through the first vertically extending part, its flow into the first variable magnetic-force magnet is prevented by the second vertically extending part so that it easily forms the short-circuit path. Therefore, the controllability of the magnetic flux which is inputted into the first variable magnetic-force magnet can be further improved.

According to a fourth aspect of the art disclosed herein, in the third aspect, each of the magnetic pole parts may have auxiliary fixed magnetic-force magnets disposed adjacent to the fixed magnetic-force magnet, at both sides of the fixed magnetic-force magnet, respectively, the auxiliary fixed magnetic-force magnets being magnetized in the circumferential direction so that the auxiliary fixed magnetic-force magnets are in series with a magnetic flux of the fixed magnetic-force magnet.

According to the above configuration, with the auxiliary fixed magnetic-force magnets, the magnetic flux from the fixed magnetic-force magnet easily forms the short-circuit path. Therefore, the controllability of the magnetic flux which is inputted into the first variable magnetic-force magnets can be further improved.

According to a fifth aspect of the art disclosed herein, in any one of the first to fourth aspects, the first vertically extending part and the laterally extending part may be formed by gaps.

According to the above configuration, since magnetic reluctance is stable in a gap, by forming the first vertically extending part and the laterally extending part by gaps, the short-circuit path can be formed stably. Further, the weight of the rotor core can be reduced.

According to a sixth aspect of the art disclosed herein, in the fifth aspect, the second vertically extending part may be formed by a second variable magnetic-force magnet having a magnetization state that is changeable in the circumferential direction by a given magnetic flux.

That is, the magnetic reluctances per unit magnetic path length of the gap and the second variable magnetic-force magnet are substantially the same. Thus, the magnetic flux of the fixed magnetic-force magnet can be suppressed from flowing into the first variable magnetic-force magnets by the second variable magnetic force magnet, when the current which flows into the coil is small. On the other hand, when the large current is supplied to the coil in order to change the state from the magnetizing state into the demagnetizing state, the magnetizing direction of the second variable magnetic-force magnet is changed because the repulsive magnetic flux flows into the second variable magnetic-force magnet. Thus, it becomes easier for this repulsive magnetic flux to flow into the first variable magnetic-force magnets via the second variable magnetic-force magnet. Therefore, the controllability of the magnetic flux which is inputted into the first variable magnetic-force magnets can be further improved.

DETAILED DESCRIPTION OF THE DISCLOSURE

Hereinafter, illustrative embodiments will be described in detail with reference to the accompanying drawings.

Embodiment 1

Figure 1:
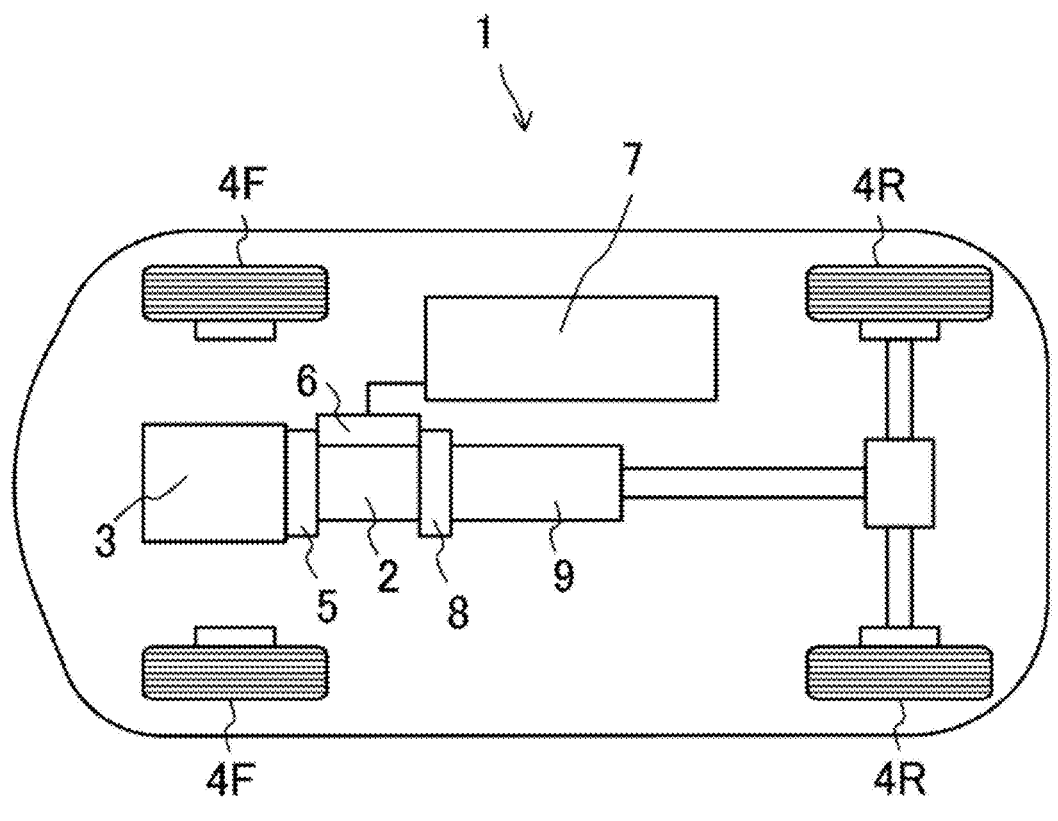
FIG. 1 is a schematic view of an automobile provided with a motor having a rotor structure according to Embodiment 1.

An automobile 1 provided with a drive motor 2 having a rotor structure according to Embodiment 1 is schematically illustrated in FIG. 1. The automobile illustrated herein is a hybrid vehicle. As drive sources of the automobile, an engine 3 is mounted in addition to the drive motor 2 (variable magnetic-force motor) to which the disclosed art is applied. These collaboratively rotate two of four wheels 4F, 4F, 4R, and 4R (two driving wheels 4R) located in a left-right symmetry. Therefore, the automobile 1 moves (travels).

In the case of this automobile 1, the engine 3 is disposed at the front side of the vehicle body, and the driving wheels 4R are disposed at the rear side of the vehicle body. That is, this automobile 1 is a so-referred to as "FR (front-engine, rear wheel drive) vehicle." Further, the engine 3 is mainly used as the drive source of this automobile, and the drive motor 2 is used to assist the drive of the engine 3 (so-referred to as "mild hybrid"). The drive motor 2 is also used as a power generator (so-referred to as "regenerator").

The engine 3 is an internal combustion engine which combusts using gasoline as fuel, for example. The engine 3 may be a diesel engine which uses diesel oil as fuel. The drive motor 2 is coupled to the rear of the engine 3 via a first clutch 5. The drive motor 2 is a permanent magnet synchronous motor which is driven by three-phase alternate current.

This drive motor 2 is a variable magnetic-force motor as described above. Its rotor is provided with a fixed magnetic-force magnet 40 and variable magnetic-force magnets 51 and 52 which will be described later, and magnetic forces of the variable magnetic-force magnets 51 and 52 are changeable. The structure of the rotor is devised to improve the motor performance. The details of the drive motor 2 will be described later.

The drive motor 2 is coupled to a drive battery 7 via an inverter 6. The drive battery 7 is comprised of a plurality of lithium-ion batteries. The rated voltage of the drive battery 7 is less than 50V (in detail, 48 V). The drive battery 7 supplies direct current power to the inverter 6. The inverter 6 converts the direct current power into the three-phase alternate current with different phases, and supplies it to the drive motor 2. Therefore, the drive motor 2 rotates.

A transmission 9 is coupled to the rear of the drive motor 2 via a second clutch 8. The transmission 9 is a multi-stage automatic transmission (so-referred to as "AT"). A rotational motive force outputted from the engine 3 and/or the drive motor 2 is outputted to the transmission 9 through the second clutch 8. The transmission 9 is coupled to a differential gear via a propeller shaft.

The differential gear is coupled to the left and right driving wheels 4R via a pair of driving shafts. When the automobile 1 is propelled (powering), the rotational motive force which is changed in the speed by the transmission 9 is distributed by the differential gear, and the distributed forces are transmitted to the respective driving wheels 4R.

When the automobile 1 slows down (regeneration), energy consumed by the drive motor 2 is recovered. In detail, when the automobile 1 brakes, the first clutch 5 is released while connecting the second clutch 8. Thus, the rotational motive force from the driving wheels rotates the drive motor 2 to generate electricity. This electric power is charged to the drive battery 7 to collect energy.

<Improvement in Fuel Efficiency>

In the case of the hybrid vehicle, since the engine 3 is mainly used when powering, the influence of the drive motor 2 on the fuel efficiency is small. On the other hand, since the drive motor 2 is mainly used when regenerating, the influence of the drive motor 2 on the fuel efficiency is large.

Since the automobile 1 slows down very often, the energy consumed during slowdown is large. Therefore, for the improvement in the fuel efficiency of the hybrid vehicle, it is important to increase the rate of the energy recovery during regeneration.

For that purpose, an increase in the output of the drive motor 2 is effective. To increase the output, it is effective to enable the change in the magnetic force of a rotor 10 of the drive motor 2 (i.e., to adopt the variable magnetic-force motor as the drive motor 2). It becomes possible to optimize the power factor in a wide operating range if the drive motor 2 is the variable magnetic-force motor, and therefore, the drive motor 2 becomes high in the output.

By optimizing the power factor (i.e., making opposing components of the magnetic forces of a stator 20 and the rotor 10 substantially in agreement with each other), the drive motor 2 can be high in the output. On the other hand, in the case of the normal permanent-magnet synchronous motor, the magnetic force of the rotor 10 is constant. Therefore, the power factor can be optimized only in a part of the operating range.

On the other hand, since the magnetic force of the rotor 10 can be changed if it is a variable magnetic-force motor, the power factor can be optimized in the wide operating range. In addition, if the power factor can be optimized in the wide operating range, the drive motor 2 can be made high in the output. Further, since an improvement in the efficiency may also be realized by devising, the fuel efficiency of the automobile 1 can be improved.

<Operating Range of Drive Motor>

Figure 2:
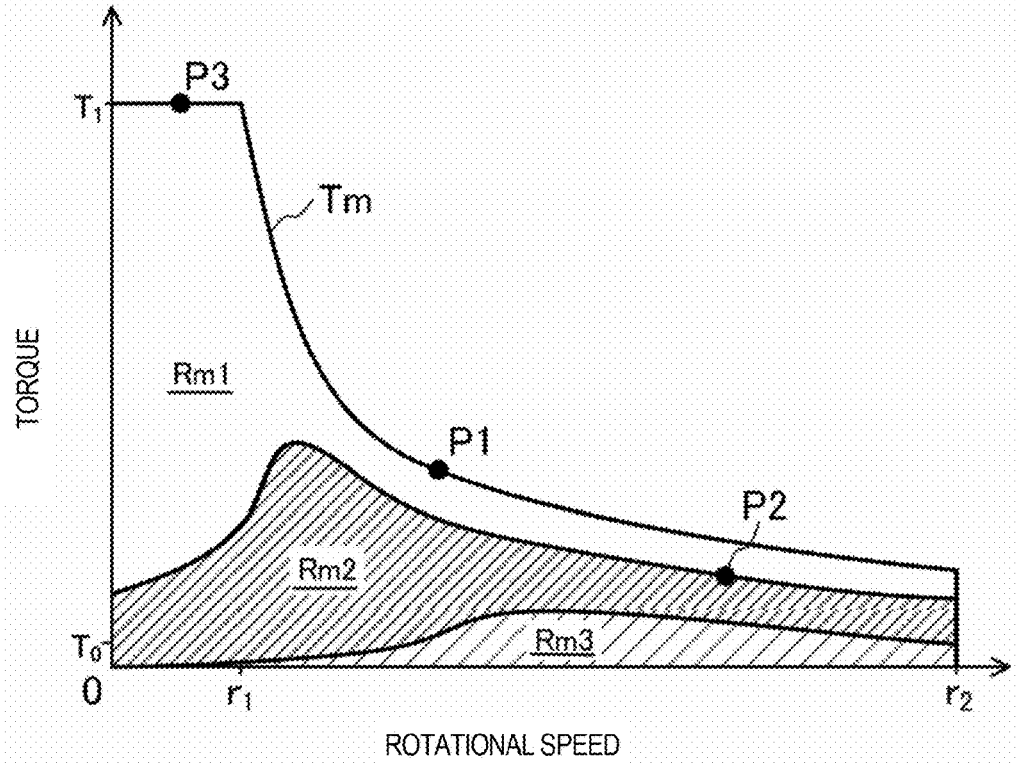
FIG. 2 is a graph illustrating an operating efficiency of the motor.

FIG. 2 illustrates a map where the operating range of the drive motor 2 is indicated. In this map, the operating range which can be outputted by the drive motor 2 is defined by a load upper limit line Tm indicating an upper limit value of torque (load) at each rotational speed.

In detail, in a low-speed range up to a given engine speed $r_1$, the upper limit of the torque is held at a maximum torque $T_1$. In a middle-speed range and a high-speed range where the engine speed is higher than the low-speed range, the upper limit of the torque is gradually decreased until the engine speed reaches an upper limit $r_2$. The operating range of the variable magnetic-force motor is divided into a plurality of magnetizing areas according to the magnetic force of the rotor 10 so that the power factor is optimized. In the illustrated map, it is divided into three magnetizing areas.

That is, it is divided into a first magnetizing area Rm1 which includes the maximum torque $T_1$ and extends on the high-load side along the load upper limit line, a second magnetizing area Rm2 which extends on the low-load side of the first magnetizing area Rm1, and a third magnetizing area Rm3 which extends on the low-load side of the second magnetizing area Rm2 and includes a torque $T_0$ at which the drive motor 2 idles at the high-rotational side (a torque which does not contribute to traveling of the automobile 1).

As for these magnetizing areas, optimal magnetic forces corresponding to respective outputs are set. Normally, the magnetic force of the first magnetizing area Rm1 is larger than the magnetic force of the second magnetizing area Rm2, and the magnetic force of the third magnetizing area Rm3 is set smaller than the magnetic force of the second magnetizing area Rm2.

The magnetizing area is estimated based on the operating state of the drive motor 2 while the automobile 1 travels, and when transitioning through the magnetizing area, the magnetic force of the rotor 10 is changed according to the magnetic force of the corresponding magnetizing area. For example, when transitioning from the second magnetizing area Rm2 to the first magnetizing area Rm1, the drive motor 2 is magnetized. At an operation point P3 (slope start, etc.) in FIG. 2, magnetization as described is performed when transitioning to the high-load side. When transitioning from the second magnetizing area Rm2 to the third magnetizing area Rm3, the drive motor 2 is demagnetized. At an operation point P2 (high-speed cruising, etc.) in FIG. 2, demagnetization as described is performed when transitioning to the low-load side. At an operation point P1 (passing acceleration, etc.), continuous high output at middle speed is required when the drive motor 2 is driven in an operating range with middle load to low load and high speed.

Although the details will be described later, when magnetizing or demagnetizing, a large pulse-shaped current is applied to given coils 22 at a timing when the rotor 10 becomes at a given position with respect to the stator 20. Thus, a strong magnetic field is generated from the stator 20 to the variable magnetic-force magnets 51 and 52 which are targets to be processed. Therefore, the variable magnetic-force magnets 51 and 52 are magnetized until a given magnetic force is obtained.

The direction of the magnetic field which occurs in magnetizing is opposite from the direction of the magnetic field in demagnetization. In magnetizing, magnetization is conducted so that the magnetic force of the variable magnetic-force magnets 51 and 52 is oriented in the same direction as the magnetic force of the fixed magnetic-force magnet 40. In demagnetization, magnetization is conducted so that the magnetic force of the variable magnetic-force magnets 51 and 52 is oriented in the opposite direction from the magnetic force of the fixed magnetic-force magnet 40. Depending on the state of magnetization, the direction and the magnitude of the magnetic force of the variable magnetic-force magnets 51 and 52 can be changed.

However, magnetization is limited by onboard apparatuses. That is, in order to magnetize the magnetic force of the variable magnetic-force magnets 51 and 52 strongly, it is necessary to supply large current to the drive motor 2, and therefore, magnetization is limited by the voltage of the drive battery 7 and the capacity of the inverter 6.

Although increasing the sizes of these apparatuses may be considered, it is difficult to increase the sizes because they are mounted on the vehicle. Therefore, according to the art disclosed herein, the structure of the drive motor 2 (particularly, the structure of the rotor 10) is devised so that magnetizing can be conducted appropriately under the limited condition using the existing apparatuses.

<Configuration of Drive Motor>

Figure 3:
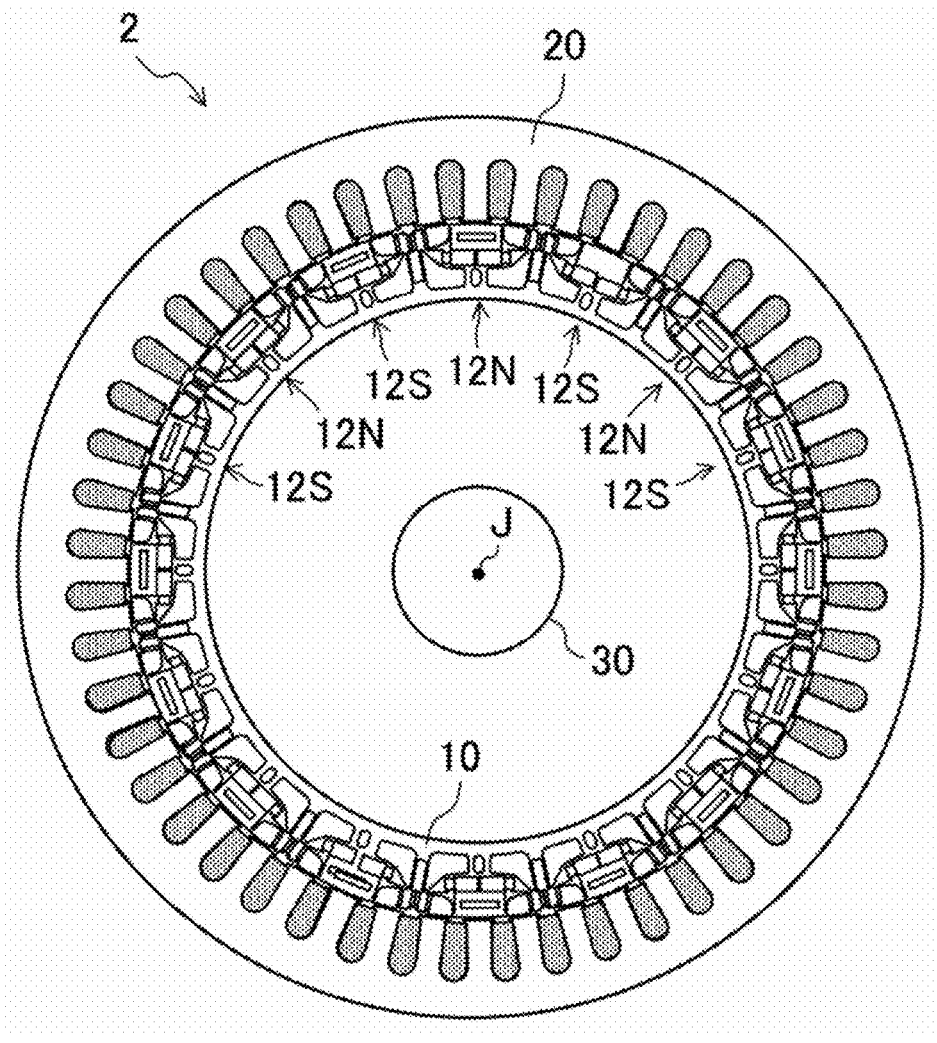
FIG. 3 is a cross-sectional view of drive motor.

FIG. 3 illustrates a cross section of the drive motor 2. As illustrated in FIG. 3, the drive motor 2 is a 16-pole motor having 16 magnetic pole parts 12 (described later). The drive motor 2 includes the rotor 10, the stator 20, and a shaft 30.

In the following description, a "rotation axis direction" or an "axial direction" indicates a direction in which a rotation axis J extends. A radial direction indicates a direction of a radius centering on the rotation axis J. A circumferential direction indicates a direction around the rotation axis J. As for the radial direction, the side far from the rotation axis J is referred to as "radially outward," and the side closer to the rotation axis J is referred to as "radially inward."

[Stator]

The stator 20 opposes to the rotor 10 in the radial direction with spacing therebetween. The stator 20 has a stator core 21 and a plurality of coils 22.

The stator core 21 has a back yoke 21a formed in an annular shape, and a plurality of (48) teeth 21b which project radially inward from the back yoke 21a. For example, the stator core 21 is a laminated core constituted by laminating in the rotation axis direction a plurality of electromagnetic steel plates with high magnetic permeability.

The plurality of coils 22 are wound around the plurality of the teeth 21b, respectively. When electric current is supplied to the plurality of coils 22, a magnetic flux is generated in each of the plurality of coils 22. For example, the plurality of coils 22 constitute a three-phase coil group which is comprised of U-phase, V-phase, and W-phase which are different in the phase of the electric current which flows. The coils 22 of these phases are disposed in order in the circumferential direction.

In this example, the magnetic flux which is generated in the plurality of coils 22 includes a rotation magnetic flux which is a magnetic flux for rotating the rotor 10, and a variable magnetic flux (given magnetic flux) which is a magnetic flux for changing the magnetization states of the first variable magnetic-force magnet 51 and the second variable magnetic-force magnet 52 which will be described later.

For example, the rotation magnetic flux is generated in the plurality of coils 22 by supplying alternate current to the plurality of coils 22. The rotor 10 is rotated by this rotation magnetic flux. Further, variable magnetic flux is generated in the plurality of coils 22 by supplying given current (for example, pulse current higher than alternate current which generates the rotation magnetic flux) to the plurality of coils 22 for a given period of time, while the rotor 10 rotates (or stops). By this variable magnetic flux, the magnetization states of the first variable magnetic-force magnet 51 and the second variable magnetic-force magnet 52 (described later) change.

[Rotor]

Figure 4:
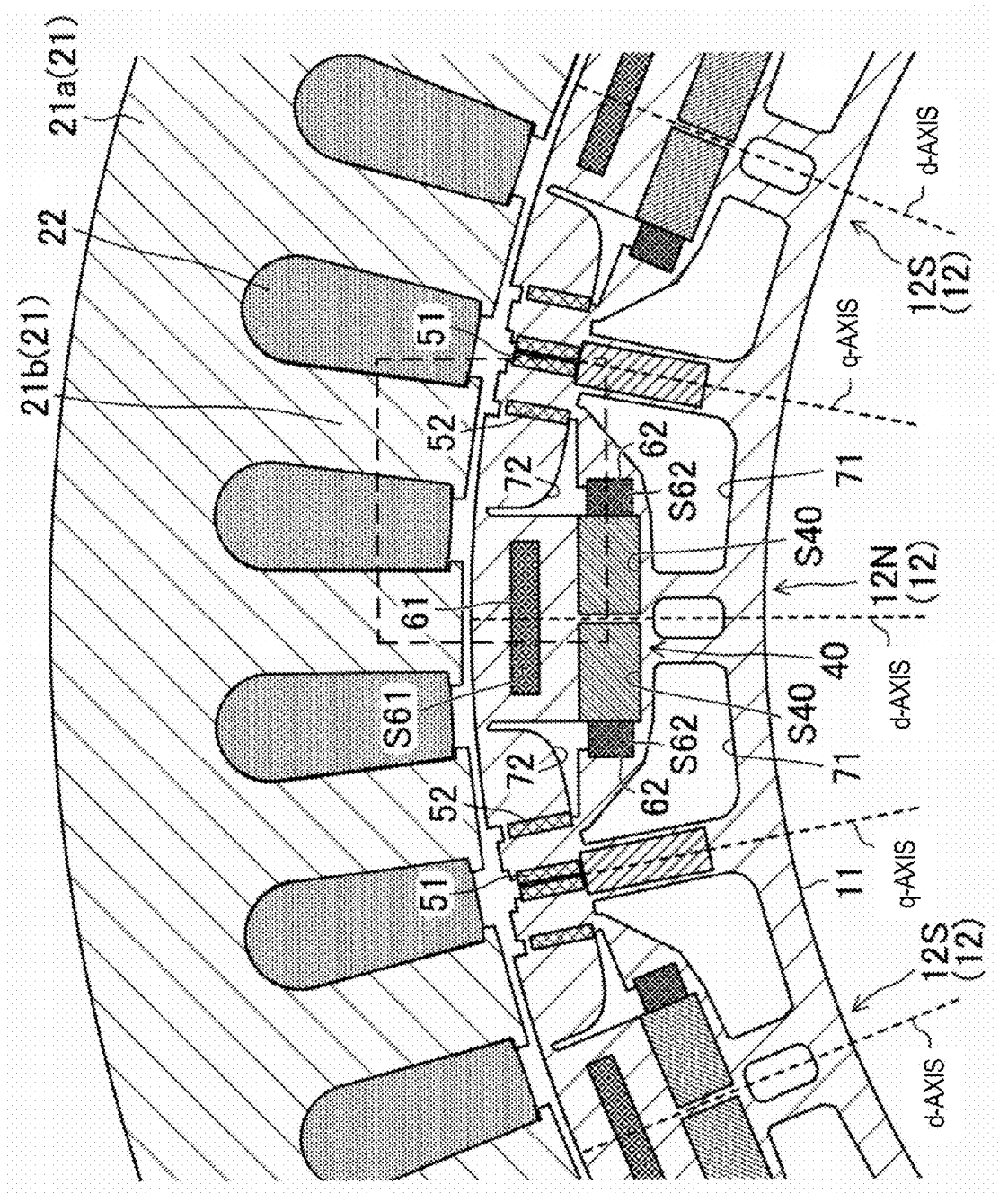
FIG. 4 is an enlarged cross-sectional view where a magnetic pole part of the motor is enlarged.

Next, the rotor 10 is described with reference to FIGS. 4 to 6. The rotor 10 includes a rotor core 11 and a plurality of magnetic pole parts 12.

[Rotor Core]

The rotor core 11 is formed in a cylindrical shape. For example, the rotor core 11 is a laminated core in which a plurality of electromagnetic steel plates with high magnetic permeability are laminated in the axial direction. A shaft hole is formed in a central part of the rotor core 11. The shaft 30 is inserted in and fixed to the shaft hole.

[Magnetic Pole Part]

The plurality of magnetic pole parts 12 are provided to the rotor core 11, and are lined up in the circumferential direction. Each of the plurality of magnetic pole parts 12 has the fixed magnetic-force magnet 40, two first variable magnetic-force magnets 51, two second variable magnetic-force magnets 52, a first auxiliary fixed magnetic-force magnet 61, and two second auxiliary fixed magnetic-force magnets 62.

The magnetic pole parts 12 which are adjacent to each other in the circumferential direction of the rotor 10 differ in the magnetic properties. In detail, the magnetizing directions of the fixed magnetic-force magnet 40, the first auxiliary fixed magnetic-force magnet 61, and the second auxiliary fixed magnetic-force magnet 62 are inverted. In the following description, some of the plurality of magnetic pole parts 12 are referred to as a "first magnetic pole part 12N," and magnetic pole parts 12 which are adjacent to the first magnetic pole parts 12N in the circumferential direction are referred to as a "second magnetic pole parts 12S."

Note that since the first magnetic pole part 12N and the second magnetic pole part 12S only differ in the magnetizing directions of the fixed magnetic-force magnet 40, the first auxiliary fixed magnetic-force magnet 61, and the second auxiliary fixed magnetic-force magnet 62, and same in other configurations, each will simply be described in the following description as the magnetic pole part 12, without distinguishing the first magnetic pole part 12N and the second magnetic pole part 12S from each other, unless otherwise particularly described.

<Fixed Magnetic-Force Magnet>

The fixed magnetic-force magnet 40 is comprised of a pair of magnets. The fixed magnetic-force magnet 40 is embedded in the rotor core 11. In this example, the fixed magnetic-force magnet 40 is accommodated in a fixed magnetic-force magnet hole S40 formed in the rotor core 11. Further, the fixed magnetic-force magnet 40 extends in a direction perpendicular to the radial direction (i.e., tangential direction). In detail, the fixed magnetic-force magnet 40 is formed in a rectangular shape in cross section, and its long-side direction is oriented in the tangential direction.

Further, the fixed magnetic-force magnet 40 is magnetized in the radial direction. In this example, the fixed magnetic-force magnet 40 of the first magnetic pole part 12N is magnetized so that its radially outward end becomes an N-pole. The fixed magnetic-force magnet 40 of the second magnetic pole part 12S is magnetized so that its radially outward end becomes an S-pole.

As for the fixed magnetic-force magnet 40, a magnet with high flux density and large coercive force, such as a neodymium magnet, is used. The fixed magnetic-force magnet 40 does not substantially change in the magnetization state even if a given magnetic flux (for example, the magnetic flux generated by the large current (for example, 750 Arms) which is outputtable by the drive battery 7 and the inverter 6) is applied. The coercive force of the fixed magnetic-force magnet 40 is larger than the coercive forces of the first variable magnetic-force magnet 51 and the second variable magnetic-force magnet 52. Although these fixed magnetic-force magnets 40 may be different magnetic bodies, the same magnetic body is used in this rotor 10.

<First Variable Magnetic-Force Magnet>

The first variable magnetic-force magnets 51 are disposed at parts on one-end side and the other-end side of the fixed magnetic-force magnet 40 in the first magnetic pole part 12N in the circumferential direction, respectively. Each first variable magnetic-force magnet 51 is disposed radially outward of the fixed magnetic-force magnet 40.

Each first variable magnetic-force magnet 51 is disposed adjacent to a q-axis. Each first variable magnetic-force magnet 51 of the first magnetic pole part 12N is adjacent to the first variable magnetic-force magnet 51 of the second magnetic pole part 12S having the q-axis therebetween. The q-axis is a virtual line which passes through between two magnetic pole parts 12 which are adjacent to each other in the circumferential direction, and extends in the radial direction.

The circumferential length between the first variable magnetic-force magnet 51 and the q-axis is shorter than the circumferential length between the first variable magnetic-force magnet 51 and the fixed magnetic-force magnet 40. The first variable magnetic-force magnet 51 opposes to the fixed magnetic-force magnet 40 in the circumferential direction with spacing therebetween.

The first variable magnetic-force magnet 51 is embedded in the rotor core 11. In this example, the first variable magnetic-force magnet 51 is accommodated in a first variable magnetic-force magnet hole S51 (see FIG. 5) formed in the rotor core 11. Further, the first variable magnetic-force magnet 51 extends along the q-axis (the q-axis which is adjacent thereto in the circumferential direction). In detail, the first variable magnetic-force magnet 51 is formed in a rectangular shape in cross section, and its long-side direction is oriented in a direction parallel to the q-axis.

Further, in each of the plurality of magnetic pole parts 12, the first variable magnetic-force magnets 51 are symmetrical with respect to a virtual line (d-axis) which passes through the center of the fixed magnetic-force magnet 40 in the circumferential direction, and extends in the radial direction.

<Second Variable Magnetic-Force Magnet>

The second variable magnetic-force magnet 52 is disposed at a position between the fixed magnetic-force magnet 40 and each first variable magnetic-force magnet 51 in the circumferential direction. Each second variable magnetic-force magnet 52 is disposed radially outward of the fixed magnetic-force magnet 40 (in more detail, the same position as the first variable magnetic-force magnet 51).

The second variable magnetic-force magnet 52 opposes to the fixed magnetic-force magnet 40 in the circumferential direction with spacing therebetween. The circumferential length between the second variable magnetic-force magnet 52 and the q-axis is shorter than the circumferential length between the second variable magnetic-force magnet 52 and the fixed magnetic-force magnet 40.

The second variable magnetic-force magnet 52 is embedded in the rotor core 11. In this example, the second variable magnetic-force magnet 52 is accommodated in a second variable magnetic-force magnet hole S52 (see FIG. 5) formed in the rotor core 11. Further, the second variable magnetic-force magnet 52 extends along the q-axis (the q-axis which is adjacent to the second variable magnetic-force magnet 52 in the circumferential direction). In detail, the second variable magnetic-force magnet 52 is formed in a rectangular shape in cross section, and its long-side direction is oriented in a direction parallel to the q-axis.

The second variable magnetic-force magnets 52 are symmetrical with respect to a virtual line (d-axis) which passes through the center of the fixed magnetic-force magnet 40 in the circumferential direction and extends in the radial direction.

<Magnetic Properties of Variable Magnetic-Force Magnet>

As for each of the first variable magnetic-force magnet 51 and the second variable magnetic-force magnet 52, a magnet with high flux density but small coercive force, such as a neodymium magnet, a samarium cobalt magnet, and alnico magnet, is used. Each of the first variable magnetic-force magnet 51 and the second variable magnetic-force magnet 52 is changeable of the magnetic force by a given magnetic flux (for example, the magnetic flux generated by the large current (for example, 750 Arms) which is outputtable from the drive battery 7 and the inverter 6). The first variable magnetic-force magnet 51 and the second variable magnetic-force magnet 52 are hardly magnetized with the current when normally driving the drive motor 2. At this time, the first variable magnetic-force magnet 51 and the second variable magnetic-force magnet 52 also function as permanent magnets.

In this example, the direction in which magnetization is easy for the first variable magnetic-force magnet 51 and the second variable magnetic-force magnet 52 is the circumferential direction (in more detail, a direction (tangential direction) perpendicular to the radial direction). The direction in which magnetization of the first variable magnetic-force magnet 51 is difficult is a direction (in this example, the radial direction) perpendicular to the magnetization-easy direction of the first variable magnetic-force magnet 51. The magnetization-difficult direction of the second variable magnetic-force magnet 52 is a direction (in this example, the radial direction) perpendicular to the magnetization-easy direction of the second variable magnetic-force magnet 52.

Further, in this example, each of the first variable magnetic-force magnet 51 and the second variable magnetic-force magnet 52 is switchable between a state where the magnetizing direction is oriented in a first direction, a state where the magnetizing direction is oriented in a second direction, and a zero state where the magnetic force becomes substantially zero. The first direction is a direction in which the magnetic flux which interlinks with the teeth 21*b* (effective magnetic flux) increases. The second direction is a direction in which the magnetic flux which interlinks with the teeth 21*b* (effective magnetic flux) decreases. For example, the first direction is a direction from the second magnetic pole part 12S to the first magnetic pole part 12N, and the second direction is a direction from the first magnetic pole part 12N to the second magnetic pole part 12S.

As for the first variable magnetic-force magnet 51 and the second variable magnetic-force magnet 52, in order to change the magnetization state in the circumferential direction by the same variable magnetic flux generated in the coil 22 of the stator 20, when the magnetizing direction of the first variable magnetic-force magnet 51 is the first direction, the magnetizing direction of the second variable magnetic-force magnet 52 also becomes the first direction, and when the magnetizing direction of the first variable magnetic-force magnet 51 is the second direction, the magnetizing direction of the second variable magnetic-force magnet 52 also becomes the second direction.

In the following description, a state where the magnetizing directions of the first variable magnetic-force magnet 51 and the second variable magnetic-force magnet 52 are oriented in the first direction is referred to as a "magnetizing state," and a state where the magnetizing directions of the first variable magnetic-force magnet 51 and the second variable magnetic-force magnet 52 are oriented in the second direction is referred to as a "demagnetizing state."
<First Auxiliary Fixed Magnetic-Force Magnet>

The first auxiliary fixed magnetic-force magnet 61 is disposed at a position radially outward of the fixed magnetic-force magnet 40. The position of the first auxiliary fixed magnetic-force magnet 61 in the radial direction is substantially the same position as the center position of the first variable magnetic-force magnet 51 and the second variable magnetic-force magnet 52 in the radial direction.

The first auxiliary fixed magnetic-force magnet 61 is embedded in the rotor core 11. In this example, the first auxiliary fixed magnetic-force magnet 61 is accommodated in a first auxiliary fixed magnetic-force magnet hole S61 formed in the rotor core 11. Further, the first auxiliary fixed magnetic-force magnet 61 extends along one end part of the fixed magnetic-force magnet 40 in the radial direction. In detail, the first auxiliary fixed magnetic-force magnet 61 is formed in a rectangular shape in cross section, and its long-side direction is oriented in the circumferential direction. The length of the first auxiliary fixed magnetic-force magnet 61 in the short-side direction is shorter than the length of the fixed magnetic-force magnet 40 in the short-side direction.

The first auxiliary fixed magnetic-force magnet 61 is magnetized so that its magnetizing direction becomes the same as the magnetizing direction of the fixed magnetic-force magnet 40. That is, the first auxiliary fixed magnetic-force magnet 61 of the first magnetic pole part 12N is magnetized so that its radially outward end becomes an N-pole. The fixed magnetic-force magnet 40 of the second magnetic pole part 12S is magnetized so that its radially outward end becomes an S-pole.

As for the first auxiliary fixed magnetic-force magnet 61, a magnet with high flux density and large coercive force, such as a neodymium magnet, is used. The first auxiliary fixed magnetic-force magnet 61 does not substantially change in the magnetization state, even if a given magnetic flux (for example, the magnetic flux generated by the large current (for example, 750 Arms) which is outputtable from the drive battery 7 and the inverter 6) is applied. The coercive force of the first auxiliary fixed magnetic-force magnet 61 is higher than the coercive forces of the first variable magnetic-force magnet 51 and the second variable magnetic-force magnet 52. Although these first auxiliary fixed magnetic-force magnets 61 may be different magnetic bodies, the same magnetic bodies are used in this rotor 10.
<Second Auxiliary Fixed Magnetic-Force Magnet>

The second auxiliary fixed magnetic-force magnets 62 are disposed on both sides of the fixed magnetic-force magnet 40 in the circumferential direction, respectively, so that the second auxiliary fixed magnetic-force magnets 62 are adjacent to this fixed magnetic-force magnet 40. The position of the second auxiliary fixed magnetic-force magnet 62 in the radial direction is the same as the fixed magnetic-force magnet 40.

Each second auxiliary fixed magnetic-force magnet 62 is embedded in the rotor core 11. In this example, each second auxiliary fixed magnetic-force magnet 62 is accommodated in a second auxiliary fixed magnetic-force magnet hole S62 formed in the rotor core 11. Further, each second auxiliary fixed magnetic-force magnet 62 extends along one end part of the fixed magnetic-force magnet 40 in the circumferential direction. In detail, the second auxiliary fixed magnetic-force magnet 62 is formed in a rectangular shape in cross section, and its long-side direction is oriented in the radial direction. The length of the second auxiliary fixed magnetic-force magnet 62 in the long-side direction is shorter than the length of the fixed magnetic-force magnet 40 in the short-side direction.

Each second auxiliary fixed magnetic-force magnet 62 is magnetized in the circumferential direction so that it is in series with the magnetic flux of the fixed magnetic-force magnet 40. In detail, each second auxiliary fixed magnetic-force magnet 62 of the first magnetic pole part 12N is magnetized so that the side closer to the fixed magnetic-force magnet 40 in the circumferential direction becomes an N-pole. Each second auxiliary fixed magnetic-force magnet 62 of the second magnetic pole part 12S is magnetized so that the side closer to the fixed magnetic-force magnet 40 in the circumferential direction becomes an S-pole.

As for the second auxiliary fixed magnetic-force magnet 62, a magnet with high flux density and large coercive force, such as a neodymium magnet, is used. The second auxiliary fixed magnetic-force magnet 62 does not substantially change in the magnetization state, even if a given magnetic flux (for example, a magnetic flux generated by the large current (for example, 750 Arms) which is outputtable from the drive battery 7 and the inverter 6) is applied. The coercive force of the second auxiliary fixed magnetic-force magnet 62 is higher than the coercive forces of the first variable magnetic-force magnet 51 and the second variable magnetic-force magnet 52. Although these second auxiliary fixed magnetic-force magnets 62 may be different magnetic bodies, the same magnetic bodies are used in this rotor 10.

<First Cavity Part>

Each magnetic pole part 12 has first cavity parts 71, each of which extends from a radially inward part of the fixed magnetic-force magnet 40 to an intermediate area of the first variable magnetic-force magnet 51 and the second variable magnetic-force magnet 52 in the circumferential direction. Two first cavity parts 71 are formed in each magnetic pole part 12. The first cavity parts 71 are formed so as to be symmetrical with respect to the d-axis.

Each first cavity part 71 extends from the position of the fixed magnetic-force magnet 40 in the circumferential direction toward the first variable magnetic-force magnet 51 so that its length in the radial direction becomes longer. A part of the first cavity part 71 which is located radially outermost is located radially inward of the radially inward end parts of the first variable magnetic-force magnet 51 and the second variable magnetic-force magnet 52.

<Second Cavity Part>

Each magnetic pole part 12 has a second cavity part 72 between the first auxiliary fixed magnetic-force magnet 61 and the first variable magnetic-force magnet 51 in the circumferential direction. Two second cavity parts 72 are formed in each magnetic pole part 12. The second cavity parts 72 are formed so as to become symmetrical with respect to the d-axis.

Figure 5:
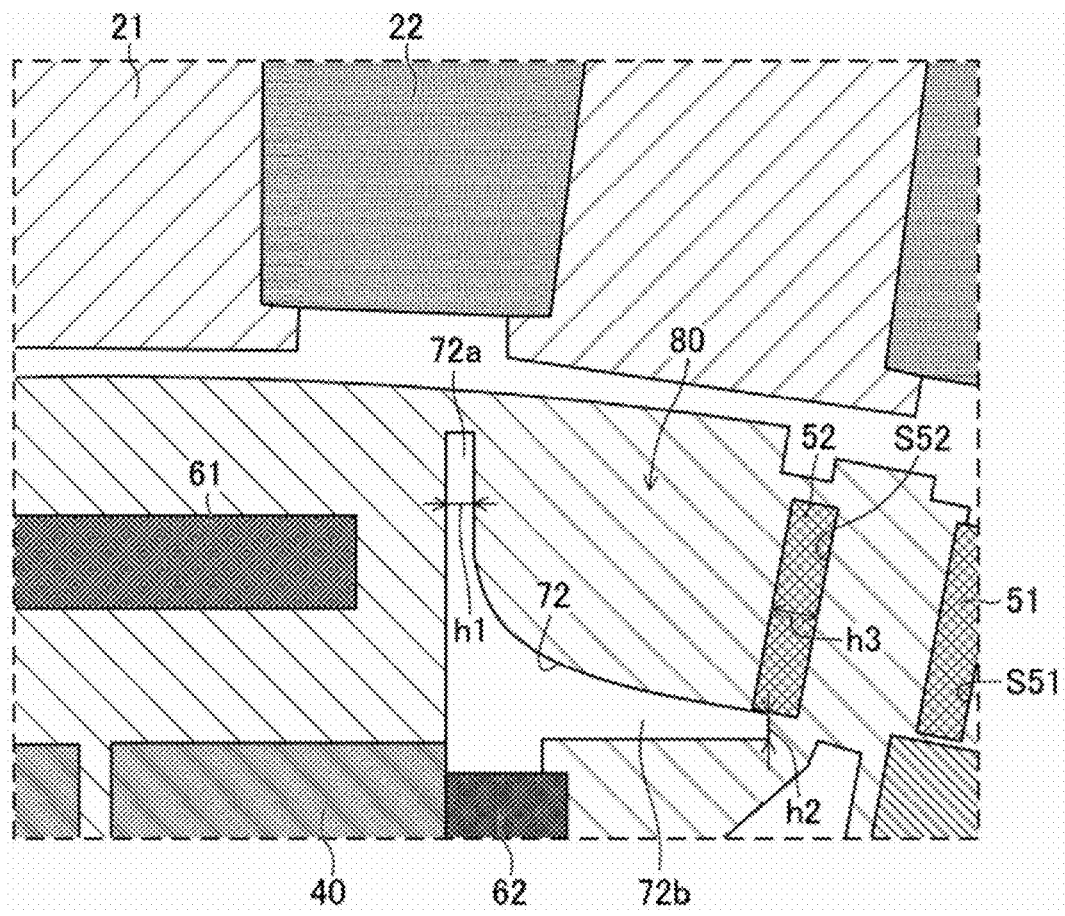
FIG. 5 is an enlarged cross-sectional view of the magnetic pole part, where an auxiliary fixed magnetic-force magnet and the periphery of a cavity are enlarged.

As illustrated in FIG. 5, the second cavity part 72 has a substantially T-shape. The second cavity part 72 has a vertically extending part 72a which extends in the radial direction, and a laterally extending part 72b which extends in the circumferential direction.

The vertically extending part 72a extends in the radial direction toward an outer edge part of the rotor core 11 from a position of the fixed magnetic-force magnet 40, at a position near the fixed magnetic-force magnet 40 in the circumferential direction. A radially outward end part of the vertically extending part 72a is located radially outward of a radially outward end part of the first auxiliary fixed magnetic-force magnet 61. The width of the vertically extending part 72a in the circumferential direction is substantially constant from its radially outward end part up to the center position of the first auxiliary fixed magnetic-force magnet 61 in the radial direction, and it becomes wider therefrom toward radially inward. In more detail, the part of the vertically extending part 72a closer to the first auxiliary fixed magnetic-force magnet 61 in the circumferential direction extends along the short-side direction of the first auxiliary fixed magnetic-force magnet 61, and the part of the vertically extending part 72a on the side far from the first auxiliary fixed magnetic-force magnet 61 in the circumferential direction is curved from the center position of the first auxiliary fixed magnetic-force magnet 61 in the radial direction so that it approaches the second variable magnetic-force magnet 52 as it goes radially inward.

A part of the vertically extending part 72a radially outward of the first auxiliary fixed magnetic-force magnet 61 is the narrowest part with the narrowest width in the circumferential direction. A width h1 of the narrowest part of the vertically extending part 72a is narrower than the minimum width of a gap between the stator 20 and the rotor 10.

The laterally extending part 72b connects the vertically extending part 72a with the second variable magnetic-force magnet 52 in the circumferential direction. The laterally extending part 72b extends from the vertically extending part 72a to the center position of the second variable magnetic-force magnet 52 in the circumferential direction. An end part of the laterally extending part 72b on the second variable magnetic-force magnet 52 side communicates with the second variable magnetic-force magnet hole S52. The laterally extending part 72b is located at a position between the fixed magnetic-force magnet 40 and the second variable magnetic-force magnet 52 in the radial direction. That is, the laterally extending part 72b is located radially inward of the center of the vertically extending part 72a in the radial direction.

The width of the laterally extending part 72b in the radial direction becomes gradually narrower from the vertically extending part 72a toward the second variable magnetic-force magnet 52. In more detail, the radially inward part of the laterally extending part 72b extends in the circumferential direction, and the radially outward part of the laterally extending part 72b is curved so that it is located radially inward as it approaches the second variable magnetic-force magnet 52. The radially inward part of the laterally extending part 72b is located at substantially the same position in the radial direction as the radially outward end part of the fixed magnetic-force magnet 40. The radially outward part of the laterally extending part 72b is curved continuously from the part of the vertically extending part 72a which is far from the first auxiliary fixed magnetic-force magnet 61 in the circumferential direction.

The end part of the laterally extending part 72b on the second variable magnetic-force magnet 52 side is the narrowest part where the width in the radial direction is the narrowest. A width h2 of the narrowest part of the laterally extending part 72b is wider than the width h1 of the narrowest part of the vertically extending part 72a. Further, the width h2 of the narrowest part of the laterally extending part 72b is narrower than a width h3 of the second variable magnetic-force magnet 52 in the circumferential direction.

The part of the second cavity part 72 which is adjacent to the fixed magnetic-force magnet 40 has the width in the circumferential direction wider than the width h2 of the vertically extending part 72a.

<High Magnetic-Reluctance Part>

A high magnetic-reluctance part 80 which is higher in the magnetic reluctance than the rotor core 11 is formed in the magnetic pole part 12, between the fixed magnetic-force magnet 40 and the first variable magnetic-force magnet 51 in the circumferential direction. In Embodiment 1, the high magnetic-reluctance part 80 is formed by the second variable magnetic-force magnet 52 and the second cavity part 72. Thus, the high magnetic-reluctance part 80 has a substantially H-shape. The vertically extending part 72a of the second cavity part 72 corresponds to a first vertically extending part of the high magnetic-reluctance part 80, the laterally extending part 72b of the second cavity part 72 corresponds to a laterally extending part of the high magnetic-reluctance part 80, and the second variable magnetic-force magnet 52 corresponds to a second vertically extending part of the high magnetic-reluctance part 80.

The magnetic reluctance of the gap and the magnet which form the high magnetic-reluctance part 80 is 1,000 times or more of the magnetic reluctance of the rotor core 11, when the rotor core 11 is not in the magnetically saturated state.

When the magnetic reluctance per unit magnetic path length is substantially the same between the gap and the magnet, the easiness of the magnetic flux passing through the high magnetic-reluctance part 80 is determined by the width of the narrowest part of each part. As described above, the width h2 of the narrowest part of the laterally extending part 72*b* is wider than the width h1 of the narrowest part of the vertically extending part 72*a* and narrower than the width h3 of the second variable magnetic-force magnet 52 in the circumferential direction. Thus, in the high magnetic-reluctance part 80, the magnetic flux most easily passes through the vertically extending part 72*a*, and passes through the second variable magnetic-force magnet 52 with the most difficulty.

[Rotor Magnetic Path]

Figure 6:
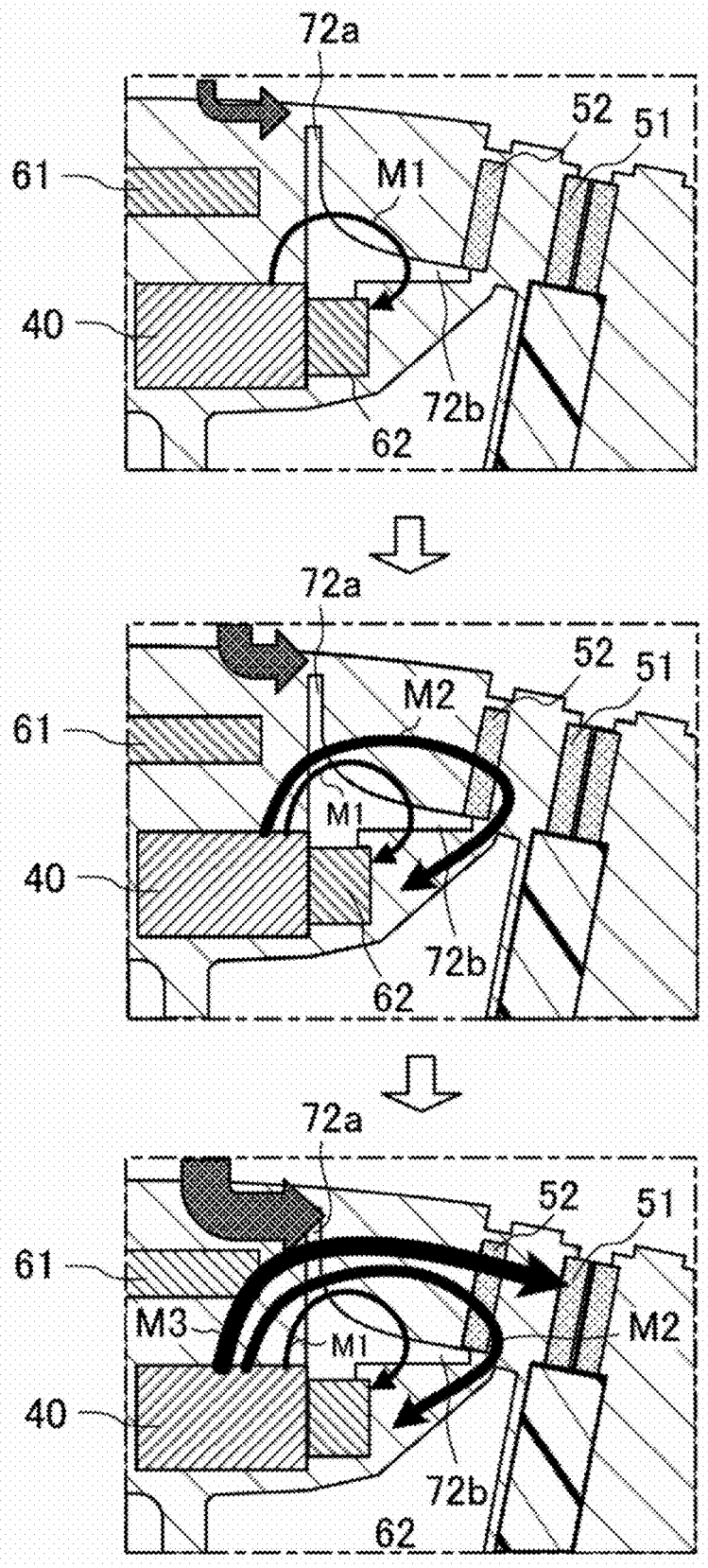
FIG. 6 is a schematic view illustrating a rotor magnetic path.

FIG. 6 illustrates a magnetic path formed from the fixed magnetic-force magnet 40 among the magnetic paths formed in the first magnetic pole part 12N of the rotor 10. In the upper figure, the middle figure, and the lower figure of FIG. 6, the current which flows into the coil 22 of the stator 20 is different. In the upper figure of FIG. 6, the current which flows into the coil 22 is the smallest, and in the lower figure of FIG. 6, the current which flows into the coil 22 is the largest.

As illustrated in FIG. 6, a first magnetic path M1, a second magnetic path M2, and a third magnetic path M3 are formed from the fixed magnetic-force magnet 40 according to the current which flows into the coil 22.

The first magnetic path M1 is a magnetic path formed when the current which flows into the coil 22 is at a small, first current value (this path is formed, even if the current which flows into the coil 22 is 0). The first current value is quite small, with which the rotor 10 can be rotated. As illustrated in each of the upper figure, the middle figure, and the lower figure of FIG. 6, the first magnetic path M1 is a short-circuit path which extends radially outward from the fixed magnetic-force magnet 40, passes through the vertically extending part 72*a* of the second cavity part 72 and the laterally extending part 72*b* of the second cavity part 72, and returns to the fixed magnetic-force magnet 40.

The second magnetic path M2 is a magnetic path which is formed when the current which flows into the coil 22 becomes a second current value larger than the first current value. The second current value is a current value with which the rotor 10 can be rotated, and is smaller than the large current when changing the magnetization states of the first variable magnetic-force magnet 51 and the second variable magnetic-force magnet 52. As illustrated in each of the middle figure and the lower figure of FIG. 6, the second magnetic path M2 is a short-circuit path which extends radially outward from the fixed magnetic-force magnet 40, passes through the vertically extending part 72*a* of the second cavity part 72 and the second variable magnetic-force magnet 52, passes through the part of the rotor core 11 between the laterally extending part 72*b* of the second cavity part 72 and the first cavity part 71, and returns to the fixed magnetic-force magnet 40. Although the details will be described later, the second magnetic path M2 is a magnetic path which is formed by the magnetic flux from the stator 20 and the magnetic flux from the fixed magnetic-force magnet 40 repelling each other weakly near the outer edge of the rotor core 11.

The third magnetic path M3 is a magnetic path which is formed when the current which flows into the coil 22 becomes a third current value which is larger than the second current value. The third current value is a current value corresponding to the large current when changing the magnetization states of the first variable magnetic-force magnet 51 and the second variable magnetic-force magnet 52. As illustrated in the lower figure of FIG. 6, the third magnetic path M3 is a magnetic path which extends radially outward from the fixed magnetic-force magnet 40, passes through the vertically extending part 72*a* of the second cavity part 72 and the second variable magnetic-force magnet 52, and reaches the first variable magnetic-force magnet 51. Although the details will be described later, the third magnetic path M3 is a magnetic path which is formed by the magnetic flux from the stator 20 and the magnetic flux from the fixed magnetic-force magnet 40 repelling each other strongly at a position of the rotor core 11 radially outward of the fixed magnetic-force magnet 40.

[Flow of Magnetic Flux]

Figure 7:
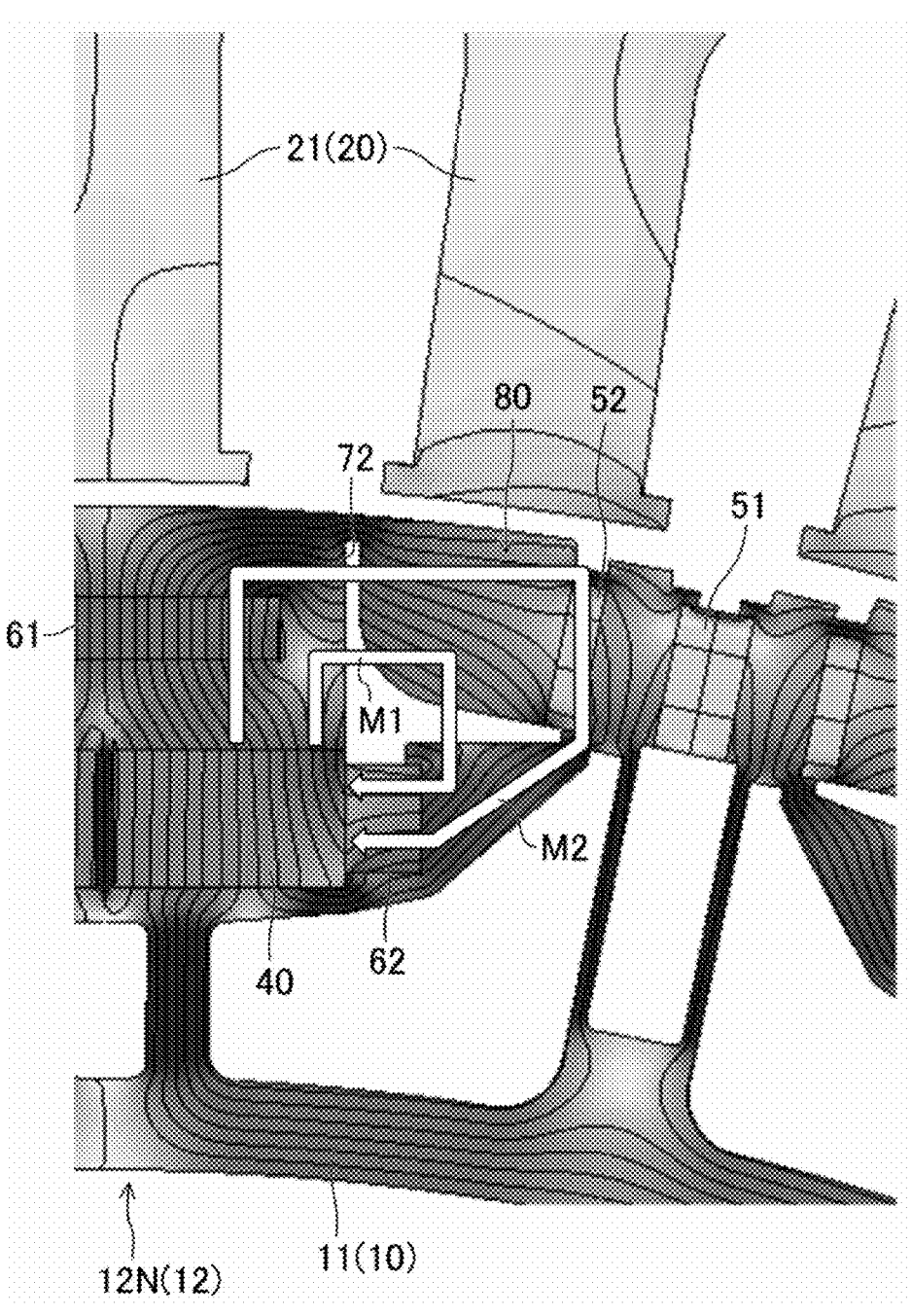
FIG. 7 is a cross-sectional view illustrating a flow of a magnetic flux when electric current which flows into a coil is small.
Figure 8:
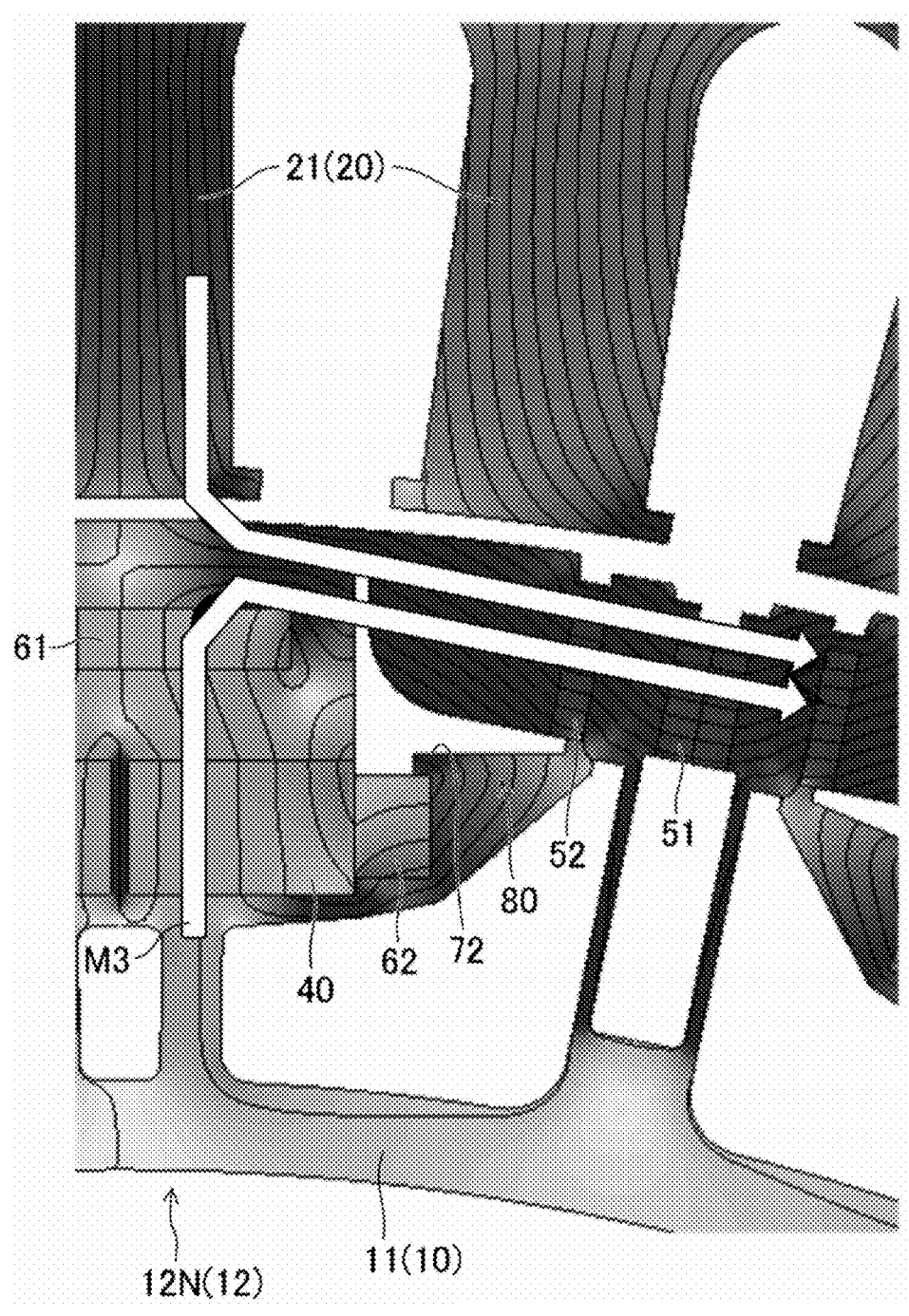
FIG. 8 is a cross-sectional view illustrating a flow of the magnetic flux when the current which flows into the coil is large.

FIGS. 7 and 8 illustrate a flow of the magnetic flux in the first magnetic pole part 12N. FIG. 7 illustrates a flow of the magnetic flux when the current which flows into the coil 22 is comparatively small (at the second current value), and FIG. 8 illustrates a flow of the magnetic flux when the current which flows into the coil 22 is comparatively large (at the third current value). Solid white arrow lines in FIGS. 7 and 8 illustrate flows of the magnetic fluxes.

As illustrated in FIG. 7, when the current which flows into the coil 22 is comparatively small, the magnetic flux from the stator 20 is comparatively weak. Thus, the magnetic flux from the stator 20 is canceled out by the magnetic flux from the fixed magnetic-force magnet 40, and hardly enters the rotor core 11. Further, even if it enters the rotor core 11, the flow into the first variable magnetic-force magnet 51 is prevented by the vertically extending part 72*a* and the second variable magnetic-force magnet 52 of the high magnetic-reluctance part 80.

The magnetic flux from the fixed magnetic-force magnet 40 is prevented by the vertically extending part 72*a* and the second variable magnetic-force magnet 52 of the high magnetic-reluctance part 80 from flowing to the first variable magnetic-force magnet 51. Thus, near the fixed magnetic-force magnet 40, the magnetic flux from the fixed magnetic-force magnet 40 forms the first magnetic path M1 to be short-circuited. Particularly, since the second cavity part 72 is wider near the fixed magnetic-force magnet 40, the magnetic flux is difficult to pass therethrough. Therefore, the magnetic flux from the fixed magnetic-force magnet 40 returns to the fixed magnetic-force magnet 40 through the narrower part among the vertically extending part 72*a* and the laterally extending part 72*b*.

Further, the magnetic flux from the fixed magnetic-force magnet 40 weakly repels the magnetic flux from the stator 20, near the outer edge of the rotor core 11. Although the repelled magnetic flux passes through the vertically extending part 72*a* and flows in the circumferential direction, the flow to the first variable magnetic-force magnet 51 is prevented by the second variable magnetic-force magnet 52. The magnetic flux from the fixed magnetic-force magnet 40 flows into the fixed magnetic-force magnet 40 directly or indirectly via the second auxiliary fixed magnetic-force magnet 62. Thus, near the outer edge of the rotor core 11, the magnetic flux from the fixed magnetic-force magnet 40 forms the second magnetic path M2 to be short-circuited. Therefore, the flow of the magnetic flux into the first variable magnetic-force magnet 51 can be suppressed, and the change in the magnetization state of the first variable magnetic-force magnet 51 can be suppressed. Here, the magnetic flux from the fixed magnetic-force magnet 40 slightly flows into the second variable magnetic-force magnet 52. However, since the magnetic flux which flows into the second variable magnetic-force magnet 52 is not so large to change the magnetization state greatly (particularly, to change it from the magnetizing state into the demagnetizing state), it will not cause any problem for the magnetization state of the drive motor 2 as a whole.

Thus, when the current which flows into the coil 22 is comparatively small, the flow of the magnetic flux into the first variable magnetic-force magnet 51 can be suppressed by the second cavity part 72 and the second variable magnetic-force magnet 52, and thus, the magnetization state of the first variable magnetic-force magnet 51 can be maintained. Therefore, the state where the opposing components of the magnetic forces of the stator 20 and the rotor 10 are substantially coincident with each other can be maintained, and the drive motor 2 can operate at a high output.

As illustrated in FIG. 8, when the current which flows into the coil 22 is comparatively large, the magnetic flux from the stator 20 is comparatively strong. Thus, the magnetic flux from the stator 20 and the magnetic flux of the fixed magnetic-force magnet 40 repel each other strongly inside the rotor core 11. The repulsive magnetic flux from the stator 20 flows to the first variable magnetic-force magnet 51 side in the circumferential direction, passes through the high magnetic-reluctance part 80, and flows into the first variable magnetic-force magnet 51. Further, the magnetic flux from the fixed magnetic-force magnet 40 is also strongly repelled by the magnetic flux from the stator 20 so that it flows to the first variable magnetic-force magnet 51 side in the circumferential direction. Since the short-circuit path to the fixed magnetic-force magnet 40 is difficult to form due to the laterally extending part 72b, a part of the repulsive magnetic flux from the fixed magnetic-force magnet 40 forms the third magnetic path M3 which flows into the first variable magnetic-force magnet 51. Therefore, the magnetization state of the first variable magnetic-force magnet 51 can be changed efficiently. Also for the second variable magnetic-force magnet 52, since a large amount of magnetic flux flows into the second variable magnetic-force magnet 52, its magnetization state is changed similarly to the first variable magnetic-force magnet 51. Particularly, when the magnetizing direction of the second variable magnetic-force magnet 52 becomes a direction from the first magnetic pole part 12N to the second magnetic pole part 12S, the magnetic flux becomes easier to flow into the first variable magnetic-force magnet 51 so that the magnetization state of the first variable magnetic-force magnet 51 can be changed efficiently.

Thus, when changing the magnetization state of the first variable magnetic-force magnet 51 (particularly, when changing from the magnetizing state into the demagnetizing state), the magnetic flux from the stator 20 and the magnetic flux from the fixed magnetic-force magnet 40 can flow into the first variable magnetic-force magnet 51 efficiently.

Effects of Embodiment 1

As described above, according to the rotor 10 having the rotor structure of Embodiment 1, since the high magnetic-reluctance part 80 which is comprised of the second cavity part 72 having the vertically extending part 72a and the laterally extending part 72b, and the second variable magnetic-force magnet 52 extending in the radial direction is formed, the magnetic flux from the fixed magnetic-force magnet 40 has difficulty flowing into the first variable magnetic-force magnet 51 so that it tends to be short-circuited near the fixed magnetic-force magnet 40. When the current which flows into the coil 22 is small, since the magnetic flux from the stator 20 is comparatively weak, it is canceled out by the magnetic flux from the fixed magnetic-force magnet 40. Therefore, the magnetic flux from the stator 20 has difficulty entering the rotor core 11, and it is difficult to flow into the first variable magnetic-force magnet 51. Even if the magnetic flux from the stator 20 enters the rotor core 11, the flow to the first variable magnetic-force magnet 51 is intercepted by the high magnetic-reluctance part 80. Since the magnetic flux from the fixed magnetic-force magnet 40 only weakly repels the magnetic flux from the stator 20, it forms at least one of the first magnetic path M1 and the second magnetic path M2 so that it is difficult to flow into the first variable magnetic-force magnet 51.

On the other hand, when the current which flows into the coil 22 is large, since the magnetic flux from the stator 20 is comparatively strong, it enters the rotor core 11, and it with the magnetic flux from the fixed magnetic-force magnet 40 strongly repel each other. The magnetic flux from the fixed magnetic-force magnet 40 and the magnetic flux from the stator 20 which repel each other pass through the vertically extending part 72a and the second variable magnetic-force magnet 52, and flow toward the first variable magnetic-force magnet 51. At this time, this repulsive magnetic flux can flow into the first variable magnetic-force magnet 51 efficiently because of the existence of the laterally extending part 72b. Therefore, the controllability of the magnetic flux which is inputted into the first variable magnetic-force magnet 51 can be improved.

Particularly, since a part of the high magnetic-reluctance part 80 is formed by the second cavity part 72 having the vertically extending part 72a and the laterally extending part 72b, the short-circuit path of the magnetic flux from the fixed magnetic-force magnet 40 can be stably formed. Further, the weight of the rotor core 11 can be reduced.

Further, since a part of the high magnetic-reluctance part 80 is formed by the second variable magnetic-force magnet 52 which the magnetization state is changeable in the circumferential direction by the given magnetic flux, the magnetic flux of the fixed magnetic-force magnet 40 can be suppressed from flowing into the first variable magnetic-force magnet 51 by the second variable magnetic-force magnet 52, when the current which flows into the coil 22 is small. On the other hand, when the large current is supplied to the coil 22 in order to change the state from the magnetizing state to the demagnetizing state, the magnetizing direction of the second variable magnetic-force magnet 52 is changed because the repulsive magnetic flux flows into the second variable magnetic-force magnet 52. Thus, this repulsive magnetic flux easily flows into the first variable magnetic-force magnet 51 via the second variable magnetic-force magnet 52. Therefore, the controllability of the magnetic flux which is inputted into the first variable magnetic-force magnet 51 can be further improved.

Further, in Embodiment 1, the magnetic reluctances per unit magnetic path length of the vertically extending part 72a and the laterally extending part 72b of the second cavity part 72, and the second variable magnetic-force magnet 52 are substantially the same, and the width h2 of the narrowest part of the laterally extending part 72b is wider than the width h1 of the narrowest part of the vertically extending part 72a, and is narrower than the width h3 of the second variable magnetic-force magnet 52 in the circumferential direction. Therefore, in the high magnetic-reluctance part 80, the magnetic flux is the easiest to pass through the vertically extending part 72a, but is the most difficult to pass through the second variable magnetic-force magnet 52. Thus, even if the magnetic flux from the fixed magnetic-force magnet 40 passes through the vertically extending part 72a, the flow into the first variable magnetic-force magnet 51 is prevented by the second variable magnetic-force magnet 52 so that it easily forms the short-circuit path. Therefore, the controllability of the magnetic flux which is inputted into the first variable magnetic-force magnet 51 can be further improved.

Further, in Embodiment 1, the magnetic pole parts 12 are disposed at both sides of the fixed magnetic-force magnet 40 so that they are adjacent to the fixed magnetic-force magnet 40, and each magnetic pole part 12 has the second auxiliary fixed magnetic-force magnet 62 magnetized in the circumferential direction so that it is in series with the magnetic flux of the fixed magnetic-force magnet 40. By this second auxiliary fixed magnetic-force magnet 62, the magnetic flux from the fixed magnetic-force magnet 40 easily forms the short-circuit path (particularly, the second magnetic path M2). Therefore, the controllability of the magnetic flux which is inputted into the first variable magnetic-force magnet 51 can be further improved.

Embodiment 2

Figure 9:
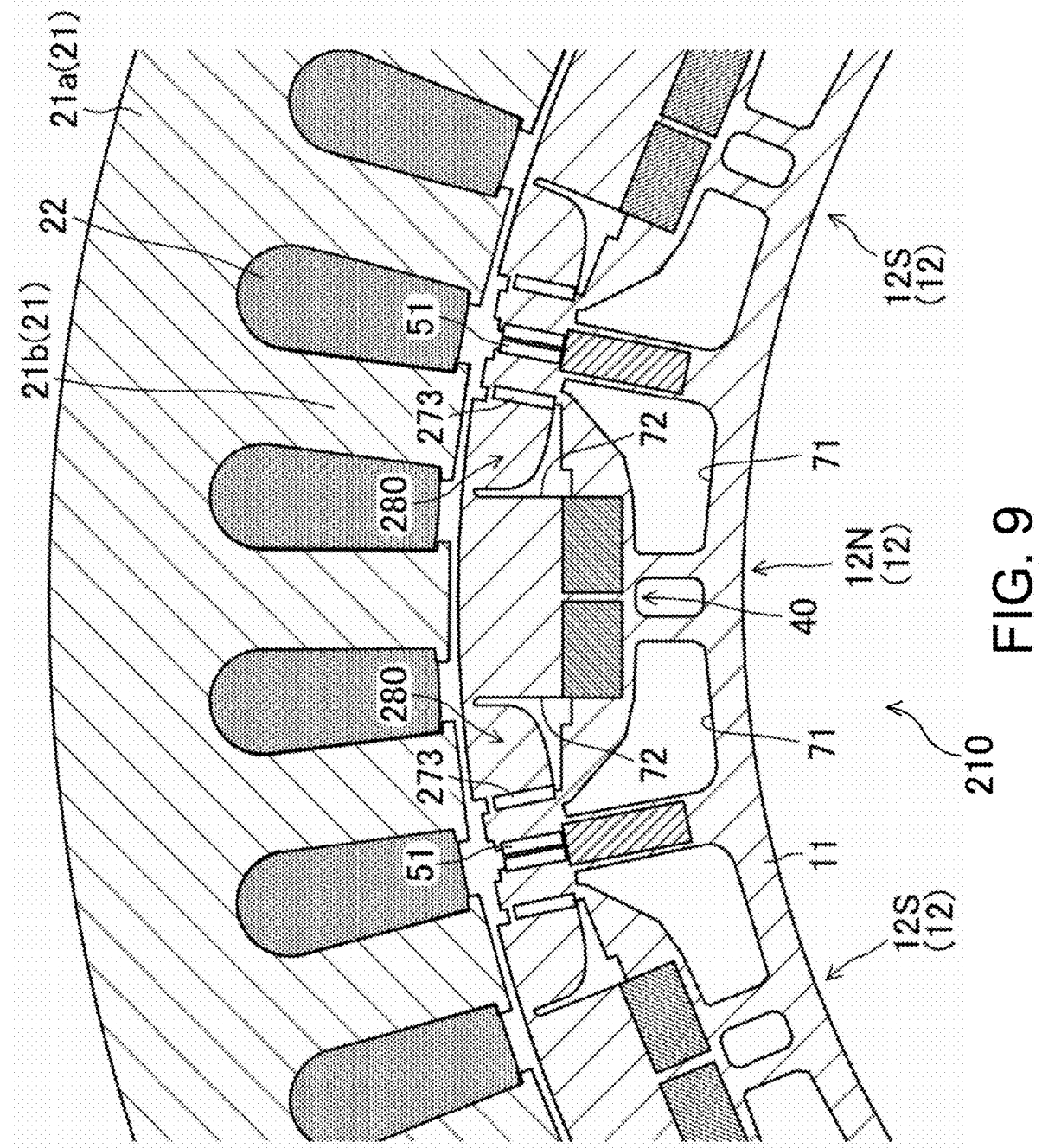
FIG. 9 is an enlarged cross-sectional view where a magnetic pole part of a motor having a rotor structure according to Embodiment 2 is enlarged.
Figure 10A:
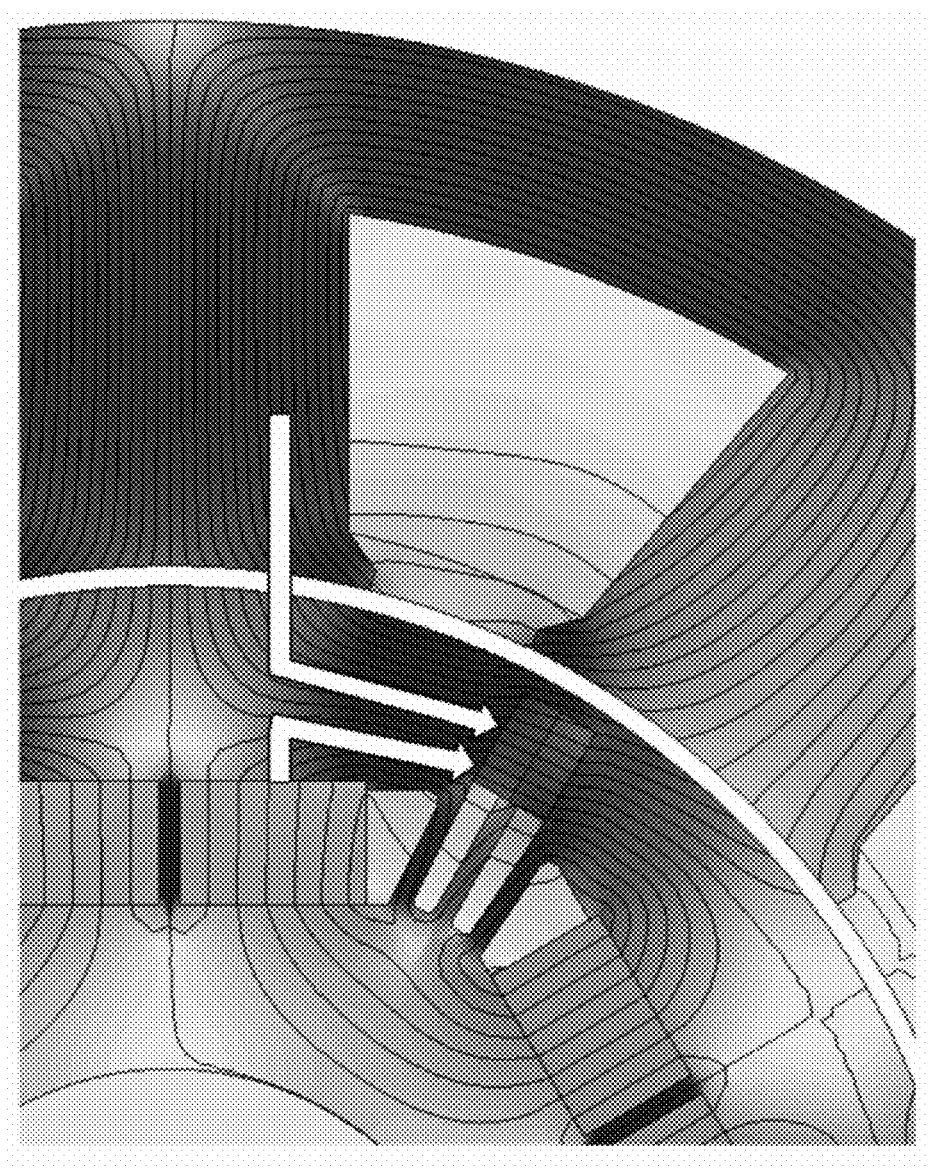
FIG. 10A is a cross-sectional view illustrating a flow of the magnetic flux when the current is small in a motor of a conventional rotor structure.
Figure 10B:
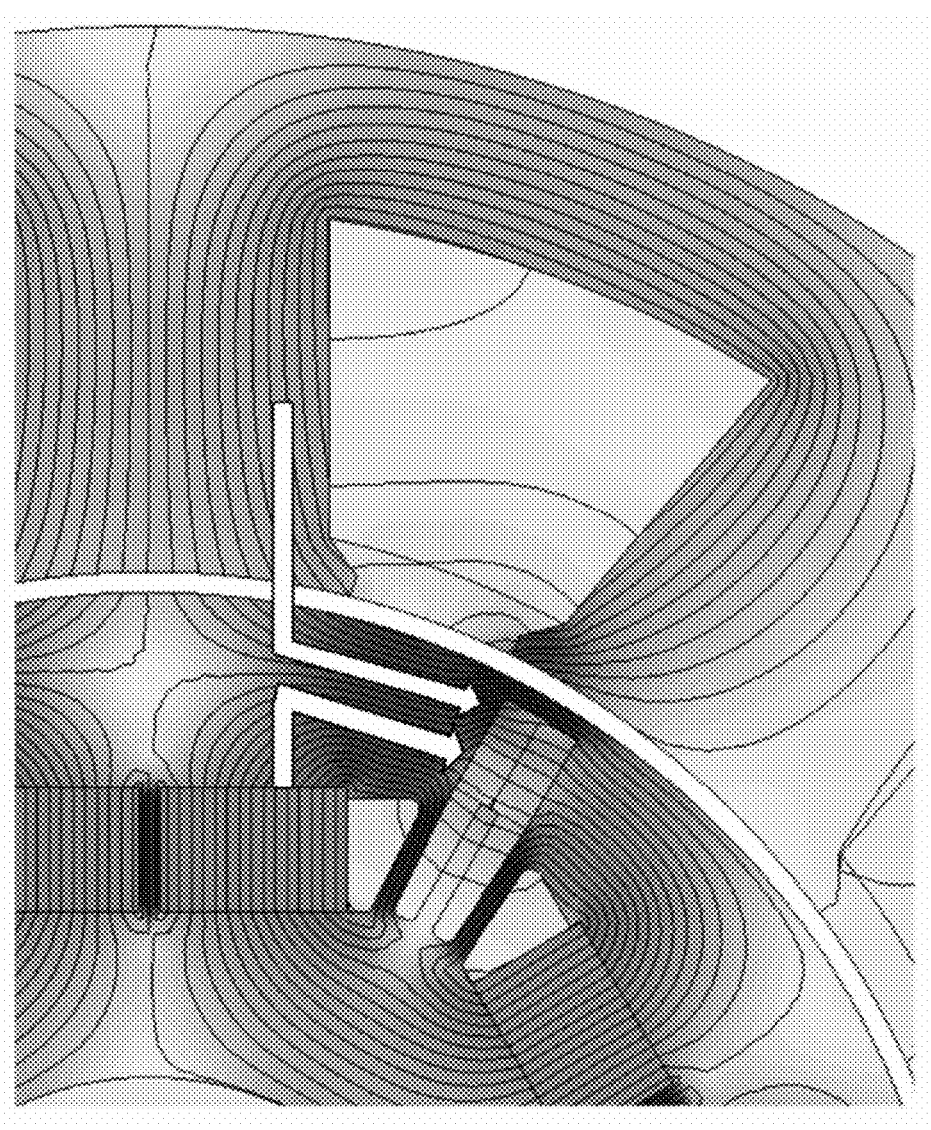
FIG. 10B is a cross-sectional view illustrating a flow of the magnetic flux when the current is large in the motor of the conventional rotor structure.

Hereinafter, Embodiment 2 is described in detail with reference to FIG. 9. Note that in the following description, the same reference characters are assigned to parts which are common with Embodiment 1 to omit the detailed description thereof.

A rotor 210 of Embodiment 2 differs from that of Embodiment 1 in that the second variable magnetic-force magnet 52, the first auxiliary fixed magnetic-force magnet 61, and the second auxiliary fixed magnetic-force magnet 62 are not provided.

In Embodiment 2, a high magnetic-reluctance part 280 is formed by the second cavity part 72 and a third cavity part 273 which communicates with the second cavity part 72. The third cavity part 273 is a part corresponding to the second variable magnetic-force magnet hole S52 in Embodiment 1. The third cavity part 273 corresponds to the second vertically extending part of the high magnetic-reluctance part 280.

In the high magnetic-reluctance part 280, the width h2 of the narrowest part of the laterally extending part 72b is wider than the width h1 of the narrowest part of the vertically extending part 72a, and is narrower than a width in the circumferential direction of the third cavity part 273. That is, the high magnetic-reluctance part 280 is narrower in the width of the narrowest part as it approaches the fixed magnetic-force magnet 40.

As described above, the magnetic reluctances per unit magnetic path length of the second variable magnetic-force magnet 52 and the gap in Embodiment 1 are substantially the same. Thus, even if the high magnetic-reluctance part 280 has such a configuration, the magnetic flux from the stator 20 and the magnetic flux from the fixed magnetic-force magnet 40 can be suppressed from flowing into the first variable magnetic-force magnet 51, when the current which flows into the coil 22 is small. On the other hand, when the current which flows into the coil 22 is large, the repulsive magnetic flux from the stator 20 and the repulsive magnetic flux from the fixed magnetic-force magnet 40 can flow into the first variable magnetic-force magnet 51 efficiently. Therefore, the controllability of the magnetic flux which is inputted into the first variable magnetic-force magnet 51 can be improved.

OTHER EMBODIMENTS

The art disclosed herein is not limited to the embodiments described above, and substitution is possible without departing from the subject matter of the appended claims.

In Embodiments 1 and 2 described above, the high magnetic-reluctance part 80 has a substantially H-shape. Without being limited to this configuration, the radially inward end part of the vertically extending part 72a and the end part of the laterally extending part 72b on the fixed magnetic-force magnet 40 side may be located at the same position in the second cavity part 72 so that the high magnetic-reluctance part 80 forms a substantially U-shape.

Further, in Embodiments 1 and 2 described above, the laterally extending part 72b of the second cavity part 72 is connected to the radially inward end part of the second variable magnetic-force magnet hole S52. Without being limited to this configuration, as long as the laterally extending part 72b is located radially inward of the center of the vertically extending part 72a in the radial direction, it may be connected to the end part of the second variable magnetic-force magnet hole S52 on the fixed magnetic-force magnet 40 side in the circumferential direction.

Further, in Embodiments 1 and 2 described above, the hybrid vehicle is illustrated as a target to which the motor having the rotor 10 or 210 is applied. Without being limited to this configuration, the motor having the rotor 10 or 210 is also applicable to an electric vehicle which does not have the engine.

The above embodiments are merely illustration, and therefore, the scope of the present disclosure must not be interpreted restrictively. The scope of the present disclosure is defined by the appended claims, and all modifications and changes which belong to an equivalent range of the appended claims are also encompassed within the present disclosure.

INDUSTRIAL APPLICABILITY

The art disclosed herein is useful as the rotor structure of the rotary electric machine provided with the rotor having the rotor core, and the stator which is disposed radially outward of the rotor and around which the coil into which the current flows is wound.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Rotor
11 Rotor Core
12 Magnetic Pole Part
20 Stator
22 Coil
40 Fixed Magnetic-force Magnet
51 First Variable Magnetic-force Magnet

52 Second Variable Magnetic-force Magnet (Second Vertically Extending Part)

62 Second Auxiliary Fixed Magnetic-force Magnet

72*a* Vertically Extending Part (First Vertically Extending Part)

72*b* Laterally Extending Part

80 High Magnetic-reluctance Part

210 Rotor

273 Third Cavity Part (Second Vertically Extending Part)

280 High Magnetic-reluctance Part h1 Minimum Value of Width of Vertically Extending Part h2 Minimum Value of Width of Laterally Extending Part h3 Minimum Value of Width of Second Variable Magnetic-force Magnet (Second Vertically Extending Part)

What is claimed is:

1. A rotor structure of a rotary electric machine, the rotor structure comprising:

a rotor having a rotor core;

a stator disposed radially outward of the rotor, a coil into which current flows being wound around the stator; and a plurality of magnetic pole parts provided to the rotor core and lined up in a circumferential direction of the rotor core, each of the magnetic pole parts including:

a fixed magnetic-force magnet being magnetized in a radial direction of the rotor core; and first variable magnetic-force magnets disposed radially outward of the fixed magnetic-force magnet, at both sides of the fixed magnetic-force magnet in the circumferential direction, respectively, a magnetization state of the first variable magnetic-force magnets being changeable in the circumferential direction by a given magnetic flux, wherein a high magnetic-reluctance part is formed between the fixed magnetic-force magnet and one of the first variable magnetic-force magnets of the rotor core in the circumferential direction, the high magnetic-reluctance part having a magnetic reluctance higher than the rotor core, and the high magnetic-reluctance part including:

a first vertically extending part extending in the radial direction toward an outer edge part of the rotor core from the fixed magnetic-force magnet, at a position near the fixed magnetic-force magnet in the circumferential direction:

a second vertically extending part extending in the radial direction toward the outer edge part of the rotor core, at a position near the one first variable magnetic-force magnet in the circumferential direction; and a laterally extending part connecting the first vertically extending part to the second vertically extending part in the circumferential direction.

2. The rotor structure of claim 1, wherein a minimum value of a magnetic reluctance of the laterally extending part is larger than a minimum value of a magnetic reluctance of the first vertically extending part, and is smaller than a minimum value of a magnetic reluctance of the second vertically extending part.

3. The rotor structure of claim 2, wherein magnetic reluctances per unit magnetic path length of the first vertically extending part, the second vertically extending part, and the laterally extending part are substantially the same, and wherein a minimum value of a width of the laterally extending part in the radial direction is larger than a minimum value of a width of the first vertically extending part in the circumferential direction, and is smaller than a minimum value of a width of the second vertically extending part in the circumferential direction.

4. The rotor structure of claim 3, wherein each of the magnetic pole parts has auxiliary fixed magnetic-force magnets disposed adjacent to the fixed magnetic-force magnet, at both sides of the fixed magnetic-force magnet, respectively, the auxiliary fixed magnetic-force magnets being magnetized in the circumferential direction so that the auxiliary fixed magnetic-force magnets are in series with a magnetic flux of the fixed magnetic-force magnet.

5. The rotor structure of claim 4, wherein the first vertically extending part and the laterally extending part are formed by gaps.

6. The rotor structure of claim 5, wherein the second vertically extending part is formed by a second variable magnetic-force magnet having a magnetization state that is changeable in the circumferential direction by a given magnetic flux.

7. The rotor structure of claim 2, wherein each of the magnetic pole parts has auxiliary fixed magnetic-force magnets disposed adjacent to the fixed magnetic-force magnet, at both sides of the fixed magnetic-force magnet, respectively, the auxiliary fixed magnetic-force magnets being magnetized in the circumferential direction so that the auxiliary fixed magnetic-force magnets are in series with a magnetic flux of the fixed magnetic-force magnet.

8. The rotor structure of claim 2, wherein the first vertically extending part and the laterally extending part are formed by gaps.

9. The rotor structure of claim 8, wherein the second vertically extending part is formed by a second variable magnetic-force magnet having a magnetization state that is changeable in the circumferential direction by a given magnetic flux.

10. The rotor structure of claim 2, wherein the second vertically extending part is formed by a second variable magnetic-force magnet having a magnetization state that is changeable in the circumferential direction by a given magnetic flux.

11. The rotor structure of claim 1, wherein magnetic reluctances per unit magnetic path length of the first vertically extending part, the second vertically extending part, and the laterally extending part are substantially the same, and wherein a minimum value of a width of the laterally extending part in the radial direction is larger than a minimum value of a width of the first vertically extending part in the circumferential direction, and is smaller than a minimum value of a width of the second vertically extending part in the circumferential direction.

12. The rotor structure of claim 11, wherein each of the magnetic pole parts has auxiliary fixed magnetic-force magnets disposed adjacent to the fixed magnetic-force magnet, at both sides of the fixed magnetic-force magnet, respectively, the auxiliary fixed magnetic-force magnets being magnetized in the circumferential direction so that the auxiliary fixed magnetic-force magnets are in series with a magnetic flux of the fixed magnetic-force magnet.

13. The rotor structure of claim 11, wherein the first vertically extending part and the laterally extending part are formed by gaps.

14. The rotor structure of claim 11, wherein the second vertically extending part is formed by a second variable magnetic-force magnet having a magnetization state that is changeable in the circumferential direction by a given magnetic flux.

15. The rotor structure of claim 1, wherein each of the magnetic pole parts has auxiliary fixed magnetic-force magnets disposed adjacent to the fixed magnetic-force magnet, at both sides of the fixed magnetic-force magnet, respectively, the auxiliary fixed magnetic-force magnets being magnetized in the circumferential direction so that the auxiliary fixed magnetic-force magnets are in series with a magnetic flux of the fixed magnetic-force magnet.

16. The rotor structure of claim 15, wherein the first vertically extending part and the laterally extending part are formed by gaps.

17. The rotor structure of claim 15, wherein the second vertically extending part is formed by a second variable magnetic-force magnet having a magnetization state that is changeable in the circumferential direction by a given magnetic flux.

18. The rotor structure of claim 1, wherein the first vertically extending part and the laterally extending part are formed by gaps.

19. The rotor structure of claim 18, wherein the second vertically extending part is formed by a second variable magnetic-force magnet having a magnetization state that is changeable in the circumferential direction by a given magnetic flux.

20. The rotor structure of claim 1, wherein the second vertically extending part is formed by a second variable magnetic-force magnet having a magnetization state that is changeable in the circumferential direction by a given magnetic flux.

* * * * *